United States Patent [19]
Hunsinger et al.

[11] Patent Number: 5,850,415
[45] Date of Patent: Dec. 15, 1998

[54] IN-BAND ON-CHANNEL DIGITAL BROADCASTING

[75] Inventors: Billie J. Hunsinger; A. J. Vigil, both of Urbana; Leland P. Solie, Mahomet, all of Ill.

[73] Assignee: USA Digital Radio Partners, L.P., Columbia, Md.

[21] Appl. No.: 454,032

[22] Filed: May 30, 1995

Related U.S. Application Data

[62] Division of Ser. No. 3,189, Jan. 12, 1993, Pat. No. 5,465,396.

[51] Int. Cl.$^6$ ................................................ H04L 25/00
[52] U.S. Cl. ........................... 375/216; 455/74; 455/143
[58] Field of Search .................................. 375/259, 260, 375/216; 455/45, 6.3, 102, 105, 142, 143, 74, 93; 381/3, 4, 5; 370/110.4, 110.1, 30; 332/120; 329/317

[56] References Cited

U.S. PATENT DOCUMENTS

| | | |
|---|---|---|
| 4,001,702 | 1/1977 | Kaufman . |
| 4,228,517 | 10/1980 | Constant . |
| 4,238,849 | 12/1980 | Gassmann . |
| 4,281,217 | 7/1981 | Dolby . |
| 4,379,947 | 4/1983 | Warner . |
| 4,476,573 | 10/1984 | Duckeck . |
| 4,498,195 | 2/1985 | Ooi et al. . |
| 4,507,746 | 3/1985 | Fletcher, Jr. ............................. 375/343 |
| 4,633,285 | 12/1986 | Hunsinger et al. . |
| 4,658,296 | 4/1987 | Pomatto, Sr. . |
| 4,660,192 | 4/1987 | Pomatto, Sr. ............................. 370/11 |
| 4,674,121 | 6/1987 | Miura et al. . |
| 4,712,240 | 12/1987 | Schnerk . |
| 5,073,898 | 12/1991 | Endo et al. . |
| 5,121,211 | 6/1992 | Koo . |
| 5,121,407 | 6/1992 | Partyka et al. . |
| 5,133,081 | 7/1992 | Mayo . |
| 5,150,377 | 9/1992 | Vannucci . |
| 5,218,717 | 6/1993 | Reitberger . |
| 5,278,826 | 1/1994 | Murphy et al. ............................. 370/76 |

FOREIGN PATENT DOCUMENTS

| | | |
|---|---|---|
| 0 279 349 | 8/1988 | European Pat. Off. . |
| 0 436 875 A2 | 7/1991 | European Pat. Off. . |
| 695353 | 8/1953 | United Kingdom . |
| WO 79/00718 | 10/1979 | WIPO . |
| WO 83/02533 | 7/1983 | WIPO . |
| WO 88/03342 | 5/1988 | WIPO . |
| WO 92/19053 | 10/1992 | WIPO . |

OTHER PUBLICATIONS

A. Bruce Carlson, Communication System, 1986, p. 209.

Miller, R.W. et al., "An Acoustic Charge Transport Digitally Programmable Transversal Filter," *IEEE Journal of Solid–State Circuits*, vol. 24, No. 6, pp. 1675–1682, Dec. 1989.

Hunsinger, B.J., "SAWs Enable the Advent of the Signal Microprocessor Development Station," 1990 Ultrasonics Symposium, pp. 1–5.

Miller, R.W., et al., "Acoustic Charge Transport Digitally Programmable Transversal Filter Development," *1990 IEEE MTT–S Digest*, pp. 1111–1114.

Bales, J.E., et al., "A GaAs ACT/IC Programmable Wide–Band Analog Signal Processor," *GaAs IC Symposium*, pp. 23–26, 1990.

Fleish, D.A., et al., "The ACT Programmable Transversal Filter," *Microwave Journal*, pp. 1–4, May 1991.

*Primary Examiner*—Don N. Vo
*Attorney, Agent, or Firm*—Townsend and Townsend and Crew LLP; Kenneth R. Allen

[57] ABSTRACT

A system for combining AM and FM transmissions. In-band, On-channel, FM Digital Audio Broadcast (IBOC FM-DAB) allows simultaneous transmission of DAB and FM over existing FM allocations without interfering with conventional analog FM signals. The utility of existing FM spectrum allocations is therefore enhanced.

9 Claims, 29 Drawing Sheets

$h_j(t) = \delta(t) + \delta(t - T)$

IN-BAND ON-CHANNEL DIGITAL BROADCASTING

This is a Division of application Ser. No. 08/003,189 filed Jan. 12, 1993 now U.S. Pat. No. 5,465,396.

BACKGROUND OF THE INVENTION

The present invention relates, in general, to broadcasting information from a plurality of sources to one or more receivers. More particularly, the present invention is directed to broadcasting a digital information waveform in the same band and on the same channel with a conventional analog waveform.

At present, the sound quality of audio programming over commercial analog frequency modulation (FM) broadcast facilities is significantly poorer than that of more modern digital signal sources such as the compact disc. A number of attempts have been made to bring the quality of digital audio to FM broadcasting, but these attempts have usually given rise to other problems which rendered them unworkable.

For example, U.S. Pat. No. 5,038,402 to Robbins discloses an apparatus and method for broadcasting digital audio over the FM broadcast band and suggests that such digital broadcasts might be interspersed with analog broadcasts, across the band. This patent allows the use of the FM band for digital broadcast, but forces the individual broadcaster to choose between broadcasting in digital, with better audio but a listener base of only the new relatively scarce digital receivers, or conventional analog, with poorer audio quality but available to all listeners with conventional analog FM receivers. The only other alternative is for the broadcaster to broadcast on two frequencies, one for digital and a second for analog; however, this presents a potential problem in obtaining a license for such broadcasting from the Federal Communications Commission (FCC). The broadcaster may or may not be able to acquire a license to broadcast on two frequencies in a given FM radio broadcasting market.

The FCC, in addition to licensing individual frequency bands to individual broadcasters, is charged with allocation of frequency spectrum to all users for all uses. One other problem presented by the system of the Robbins patent and others like it is that spectrum must be allocated especially for digital FM broadcast if the number of analog broadcasters presently on the air is to remain unchanged. This problem is exacerbated by the fact that, for most of the United States and at attainable frequencies, there is no unused spectrum. In order for spectrum to be re-allocated for a new use, the FCC and the petitioners desiring use of a frequency band must go through a protracted, uncertain, political process which will culminate in an FCC decision on how the spectrum in question should be used.

For these reasons, there has been a need for digital audio broadcasting over the FM band which does not require a broadcaster to abandon its investment in analog FM transmission equipment, require a new frequency assignment in the existing FM band, require the listening audience to discard existing analog FM receivers, or force the FM program broadcasters to undergo a protracted, uncertain and expensive process to obtain a new frequency allocation.

SUMMARY OF THE INVENTION

It is, therefore, an object of the present invention to provide a system for digital audio broadcasting on the existing FM broadcast band. More particularly, the purpose of this invention is to provide a system for In-band, On-channel, FM Digital Audio Broadcast (IBOC FM-DAB) which would allow simultaneous transmission of DAB and FM over existing allocations without interfering with the conventional analog FM signals. Such a system not only would be of great value to the broadcast industry, but the ability to multiplex supplemental message information over conventional analog FM transmissions would be of general interest and importance from a perspective of efficient spectrum utilization. In addition, a system which solves the problems raised for FM DAB will inherently find applications in many other communications' environments.

Once the requirement for an in-band, on-channel digital audio broadcast is defined, a number of subsidiary problems arise in executing that broadcast. In particular, the digital signal and the FM program must be modulated together in such a way that they can be demodulated and used by various end users on the receiver end. This causes problems of receiver design, which are made more complex since allowance must be made for disturbances which occur in the communications channel between the transmitter and receiver. For example, in FM transmission, demodulation is often inhibited by multipath, which applies fast, undesired phase changes to FM signals thereby causing a loss of phase lock in conventional receivers which normally use "phase locked loops" (PLLs). Reacquisition of lock with a conventional PLL causes an undesired spurious time response at the demodulation output of the receiver, which adversely affects audio quality.

In one aspect, this invention is directed to a method for introducing supplemental programming (more messages) to a given FM broadcast by amplitude modulating the FM waveform. The supplemental amplitude modulation is orthogonal to the initial frequency modulation so that both the AM and FM programs can be demodulated, either independently or together, without interfering with one another. This method thus provides a vehicle for the simultaneous transmission of supplemental programming, such as high bit rate DAB, with existing FM over the same spectral allocation at the same time without degrading the analog FM transmission. This invention is applicable to any system in which additional programming or an additional message is to be added to enhance or supplement another program which frequency modulates a carrier.

More specifically, the present invention is directed to a method and apparatus for modulating a DAB signal, consisting of 21 digital carriers, onto an analog FM carrier such that mirror images of the 21 digital carriers are spaced in frequency on either side of the analog FM carrier. These DAB carriers slew through the frequency band at the instantaneous rate of the analog FM carrier. This slewing in frequency is accomplished without causing interference between the analog FM audio and digital subcarrier signals. The analog FM program signal then becomes, in a sense, a carrier for the 21 digital subchannels. By slewing through frequency, the composite signal becomes resistant to multipath distortion. Further resistance to multipath is derived through the addition of a continuously transmitted wideband reference signal to the 21 digital subchannel modulation waveforms. This reference waveform is used at the receiver as a training system for adaptive multipath equalization with quick and continuous updating. Additional resistance to multipath distortion comes from the use of data interleaving and data coding systems which are customarily used to detect and correct errors in digital signal systems. As a result, the FM DAB transmission system of the invention provides unusually good resistance to multipath induced distortion. The FM DAB signal is modulated at a significantly lower peak power and is positioned within the allocated spectrum mask which is licensed to each broadcaster. This allows each broadcaster to transmit the digital signal within the licensed frequency on a single FM channel.

An important consideration in the development of an in-band, on-channel FM digital audio broadcasting (FM-DAB) system is the requirement that the digital signals not interfere with the analog FM signals occupying the same frequency allocation. An in-band, on-channel FM-DAB signal simultaneously occupies the same frequency allocation as a conventional analog FM broadcast signal. The characteristics of the digital signal must therefore be designed to prevent degradation of the analog signal. One approach to minimizing interference is to reduce the amplitude of the digital signal relative to the analog signal. Of course, the amplitude of the digital signal cannot be made arbitrarily small, because interference from the analog signal and thermal noise will ultimately degrade the digital signal. Once the digital signal amplitude has been reduced to the smallest possible level which maintains the desired bit error rate over the desired coverage area, then another technique must be used to ensure non-interference with the analog signal. One such technique is to design the frequency-domain characteristics of the digital signal such that it is orthogonal to the analog signal.

Digital signals occupying the same frequency allocation as analog FM signals add a random-noise component to the received signal. A 50-dB audio (post-detection) signal-to-noise ratio (SNR) requires between 30 and 50 dB of "protection" against digital quadrature phase-shift keyed (QPSK) and quadrature amplitude modulated (QAM) signals. The wide variation in these protection ratios arises from differing test methods; a CCIR-recommended quasi-peak detection approach gives protection ratios of 38.5 to 48.5 dB to maintain 50-dB audio SNR in the presence of co-channel digital 256-QAM and QPSK signals. An alternative approach, using an RMS detection to measure "unweighted" SNR, yields protection ratios of 30 to 32 dB for co-channel 256-QAM digital signals, although significant audio degradation may occur at these levels.

Additional suppression of interference may be achieved by modulating the digital signal in a way that ensures that it is orthogonal to the analog signal. One method of achieving this orthogonality is to design the digital signal spectrum such that it is never superimposed directly on the analog signal spectrum. While frequency separation may not seem feasible for in-band, on-channel systems, it may be accomplished in systems which employ frequency sliding of the digital signal. In this approach, the center frequencies of the digital carriers are modulated by the FM program. This allows the correlation between the digital and the analog signals to be minimized, which also minimizes the mutual interference between the signals.

Of course, practical system implementations cannot be expected to maintain perfect orthogonality, and any correction between the analog and digital signals will result in some amount of mutual interference between the signals. The amount of interference will depend on the ability to prevent any overlap between the analog signal spectrum and the digital signal spectrum. By proper design and implementation of the digital waveform, clear-channel interference suppression of 10 to 20 dB is readily accomplished. Thus the protection ratio of 40 to 50 dB may be achieved by transmitting the digital signals approximately 30 dB below the analog carrier level.

Minimization of the correlation between the analog and digital signals in a clear (multipath-free) channel does not guarantee minimal interference in the presence of multipath. If the direct-path signal is made orthogonal to the analog signal, the delayed-path signal will not be perfectly orthogonal, and the amount of interference between the signals will depend on the frequency difference (which is proportional to the delay time of the echo and FM rate). To minimize interference in this case, the separation between the analog signal spectrum and the digital signal spectrum must be made sufficiently large to maintain orthogonality even in high-multipath environments. For multipath delay spreads of 1 to 5 microseconds, this separation must be between 5 and 30 kHz for 100 percent modulation. For extreme multipath environments, with sufficient delay spread to cause loss of orthogonality between the analog and digital signals, the analog FM signal will be degraded by the multipath to the point at which the decrease in signal-to-noise ratio caused by the digital signal is expected to be imperceptible at the audio output of the receiver.

Another aspect of the invention includes provision of receivers which will demodulate either the analog FM program, the digital DAB program, or both. In one embodiment of the receiver, the transmitted digital audio signal is extracted from the standard analog FM signal on which it is carried by a programmable notch filter based upon acoustic charged transport (ACT) technology. The ACT-based receiver optimizes the passage of the desired (digital) signal while suppressing the undesired (analog) signal.

In addition to CD quality stereo programming and improved data services, Digital Audio Broadcast (DAB) promises to mitigate the adverse impact of multipath. In-band, on-channel FM DAB delivers CD-quality audio within existing spectral allocations, while not interfering with existing FM broadcast reception. Most measures proposed for mitigating multipath involve the use of new spectrum.

Multipath is the time domain phenomenon wherein successively delayed versions of a broadcast signal arrive at the receiver simultaneously. Multipath is typically random and time variant. A multipath channel time response has an associated frequency response. Multipath is usually characterized in the frequency domain in terms of amplitude fade depth, spatial and temporal correlation of fade depths, and frequency coherency which relates to fade bandwidth. Techniques employed for mitigating multipath include: spread spectrum modulation; data encoding; frequency division multiplexing; adaptive channel equalization; and, time, frequency and spatial diversity.

Spatial diversity in the form of multiple antennas has been shown to be helpful in improving FM reception in automobiles; however, due to practical and aesthetic considerations, the use of multiple antennas has not been accepted by the FM radio industry and is not considered a part of the solution for multipath mitigation. Spread spectrum has been clearly shown to alleviate multipath, but bandwidth requirements for IBOC DAB are not consistent with existing spectral allocations for FM.

Frequency diversity becomes effective against multipath as spectral separation employed begins to exceed multipath coherence bandwidths. Urban FM multipath is thought to have coherence bandwidths in the 30 to 300 kHz range, and is thought to be resistant to in-band on-channel frequency diversity techniques; however, FCC 73.317 defines the spectral allocation for commercial FM in the United States over a 1.2 MHz bandwidth. Compliance with FCC 73.317 allows the power within 480 kHz of this bandwidth to reach 25 dBc. Using some of this power for IBOC DAB allows for a level of frequency diversity which is exploited towards the mitigation of multipath.

Adaptive channel equalization has been shown to improve multipath reception in radio systems, but the rapidly varying nature of multipath in automobiles precludes the use of conventional adaptive equalization techniques. Frequency division multiplexing, data encoding and time diversity complement frequency diversity measures and ACT-based equalization techniques provide a comprehensive in-band on-channel FM DAB system with surprisingly high multipath resistance.

Three measures inherent to the modulation method are employed to mitigate multipath: a frequency slide technique, frequency division multiplexing, and an ACT-based equalization technique.

"Frequency sliding" is a modulation technique in which the carrier frequencies of a series of digital subchannels are modulated by the FM program. This has the effect of producing a constant frequency offset between the analog-FM carrier and the IBOC digital signals. The primary motivation for IBOC DAB frequency slide is that sliding the DAB carrier frequencies in synchronization with the instantaneous FM signal frequency may be used to make conventional FM detection techniques insensitive to IBOC DAB. The added benefit of frequency slide is multipath mitigation. Frequency slide increases the effective IBOC DAB bandwidth for multipath mitigation without increasing the IBOC DAB noise bandwidth. Frequency slide contributes a level of effective frequency diversity against multipath.

Frequency division multiplexing is a common practice for mitigating multipath. The time domain advantage of frequency division multiplexing is the reduction of intersymbol interference (ISI) in each subchannel due to multipath with respect to the ISI which would otherwise be seen by the proportionally shorter duration symbols on a single carrier. The frequency domain advantage of frequency division multipath is the isolation of the effects of narrowband fading to a fraction of the subchannels. The errors induced on the affected subchannels are recovered through data decoding.

The ACT-based equalization technique is used to compensate for nonuniform phase distortion induced by multipath across the band. This measure allows for the coherent contribution of delayed signal components to the digital demodulation process. All the delayed signal components contribute coherently to the demodulation of each data symbol. The processing gains are analogous to those of an ideal channel equalizer with no adaptation time.

Data encoding and error correction are the subject of substantial research efforts for a variety of communications and data storage applications, and the power and efficiency of these techniques have increased significantly as a result of these efforts. Three measures inherent to the data encoding technique may be used to mitigate the effects of multipath: block coding, convolutional coding, and data interleaving.

Block coding is used to detect and correct errors. A portion of the errors due to narrowband fades or to temporary fades in a moving vehicle may be detected and corrected through block coding. Block coding is also referred to as "error detection and correction".

Convolutional coding provides processing gain against losses of signal level through soft decision Viterbi decoding. Convolutional coding also distributes information across subchannels which adds a level of effective frequency diversity to the modulation. Soft decision Viterbi decoding essentially gives the decoder the demodulation information as well as subchannel reliability information. Data is decoded according to a set of relative subchannel confidence metrics.

Data interleaving is used to distribute burst errors between levels of coding so as to make burst errors appear random. Although convolutional encoding adds processing gain to the demodulation process, errors which do propagate through soft decision Viterbi decoding are usually bursty in nature. Interleaving spreads out burst errors in time so as to enable correction by the block decoder.

The DAB receiver includes a frequency tracking delay element interference canceler and FM demodulator which removes a dominant tone or FM interference signal by subtracting it from a delayed replica. Cancellation is maintained through a time delay that tracks the instantaneous frequency of the dominant FM interfering waveform. A delay is generated, accurately controlled and dynamically adjusted in response to changes in the instantaneous frequency of the dominant tone or FM interference signal. A phase or phase threshold detector is used to track small errors in cancellation phase in order to close the loop on the tracking canceler and to make the tracking canceler resistant to multipath. The control voltage at the adjustable delay element varies with the instantaneous frequency of the predominant tone. In the case where an FM signal is tracked and cancelled, the control voltage becomes a demodulated FM program.

This embodiment of the receiver provides the ability to cancel or filter out a single large undesired signal whose frequency is unknown, changing or both. The tracking delay element notch filter is an adaptable filter which uses a very simple feed back implementation, to continuously adjust the center frequency of a notch filter in response to the instantaneous frequency of a predominant input signal. The critical implementation component is a single adjustable delay time.

Cancellation is made possible by delay elements whose relative delays are adjusted quickly and linearly in response to the center frequency and whose amplitude responses may also be adjusted to control the depth of the cancellation. A 180° phase detector provides the delay control signal, is relatively easy to implement, may be used in a threshold sense or as a linear detector, and may be adjusted in detection sensitivity to control the loop dynamics which establish the accuracy of frequency tracking.

The tracking notch can track the instantaneous frequency of an FM input signal in real time. The control voltage which causes the frequency of the notch to track the frequency of the predominant incoming waveform tracks the instantaneous frequency of the input signal to control the instantaneous notch frequency. The tracking canceler demodulates FM by estimating instantaneous frequency directly with this voltage rather than indirectly by tracking phase as in a conventional PLL. Phase discontinuities, such as those which may be encountered while moving through a multipath environment, have less effect on a tracking canceler which tracks frequency than on a conventional PLL which tracks phase. The result is an FM demodulator which is more stable than a conventional PLL in a moving multipath environment.

In another aspect of the invention, the IBOC FM-DAB receiver incorporates an FM to AM conversion canceler which functions upon the principle that the amplitude of the FM to AM conversion interference component is correlated to the instantaneous frequency of the FM signal as a function of the channel multipath. The FM to AM conversion canceler estimates this correlation and continuously updates the estimate. A cancellation signal is generated within the receiver which corresponds with the correlation estimate and is used for canceling the effective multipath from the received signal. Three embodiments of the FM to AM conversion canceler are shown. The first provides a base band cancel signal which is generated from a "look up table". The look up table includes a running estimate of the FM to AM conversion interference to be expected from a given instantaneous FM frequency. A second embodiment based on polynomial channel estimation includes a polynomial generator which is driven by the FM signal frequency for estimation of the FM to AM conversion interference in the channel. This estimate is subtracted from the raw DAB composite as before. The coefficients of the polynomial are derived by measuring and integrating the cross correlation between the resulting DAB composite and each term of the polynomial. In a third embodiment of the FM to AM conversion canceler, polynomial channel estimation is implemented in the intermediate frequency (IF) section of the receiver. For the third embodiment, two separate polynomials are used to continuously estimate and cancel the in-phase and quadrature components of the FM to AM interference caused by multipath.

DETAILED DESCRIPTION OF THE PREFERRED EMBODIMENT

A) AM over FM composite signal generation, modulation and demodulation

Figure 1:
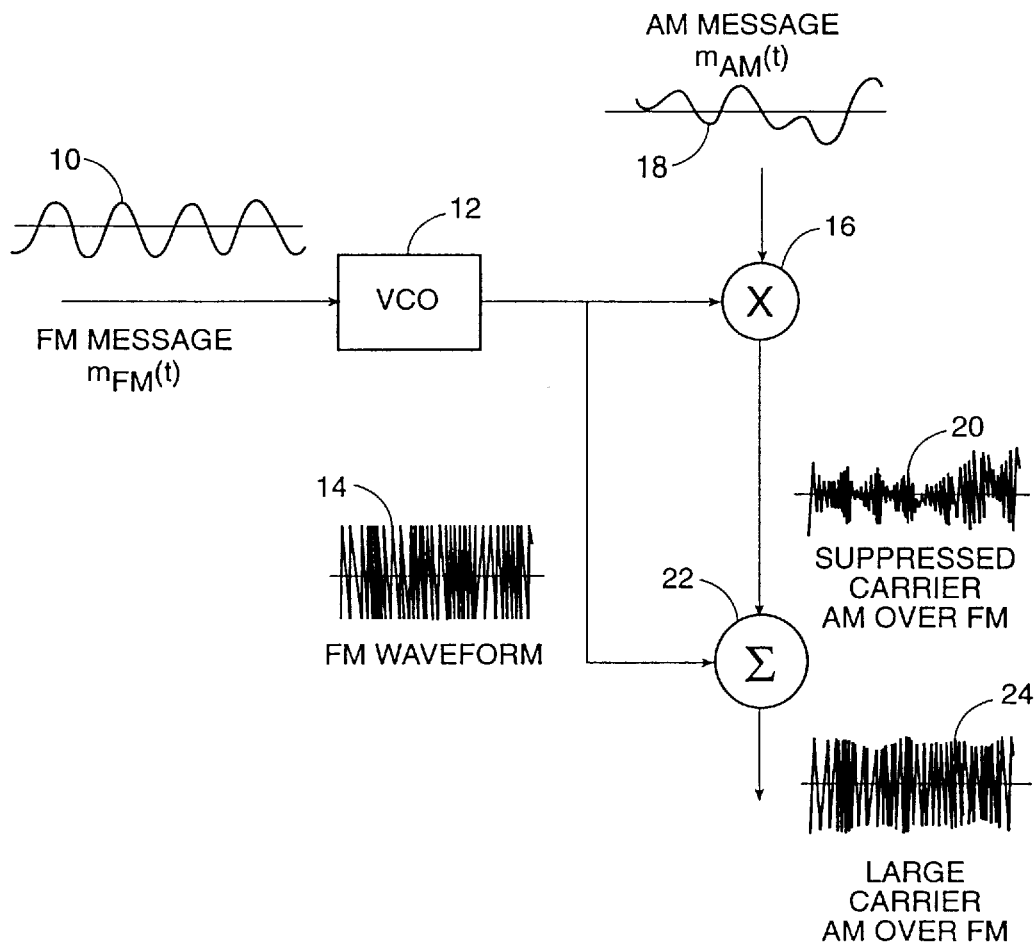
FIG. 1 illustrates the generation of AM over FM through amplitude modulation of an FM waveform.

The generation of AM over FM is illustrated in FIG. 1. An FM message $m_{FM}(t)$ 10 excites a VCO or other FM modulator 12 to generate an FM waveform 14. This FM waveform 14 is multiplied in mixer 16 by AM message $m_{AM}(t)$ 18 to yield double sideband suppressed carrier (DSB-SC) over FM signal 20. DSB-SC over FM signal 20 is summed at 22 with FM signal 14 to yield double sideband large carrier (DSB-LC) AM over FM signal 24. For proper generation of DSB-LC AM over FM signal 24, the peak amplitude of the FM 14 component should be greater than the peak value of the DSB-SC over FM component 20. The FM message $m_{FM}(t)$ 10 is modulated onto the frequency of the AM over FM modulation waveform 24, while the AM message $m_{AM}(t)$ is modulated onto the amplitude of the AM over FM modulation waveform 24. Both may be demodulated, either together or independently, without interference from the other.

Figure 2:
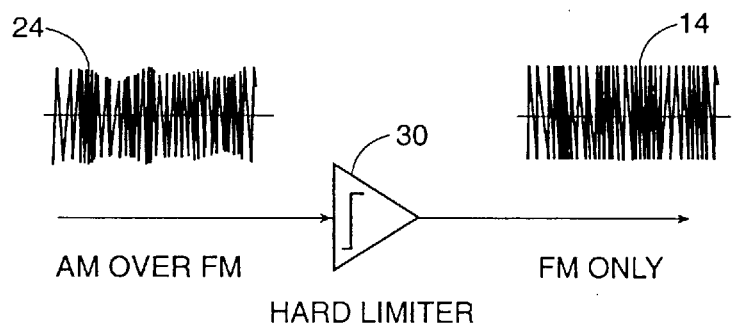
FIG. 2 illustrates the isolation of FM from AM over FM at the receiver.

FIG. 2 illustrates a process used to isolate FM 14 from AM over FM 24. A hard limiter 30 or zero crossing detector is used to clip the amplitude information from the AM over FM waveform 24, leaving the FM waveform 14 isolated for demodulation through a discriminator or phase locked loop.

Figure 3:
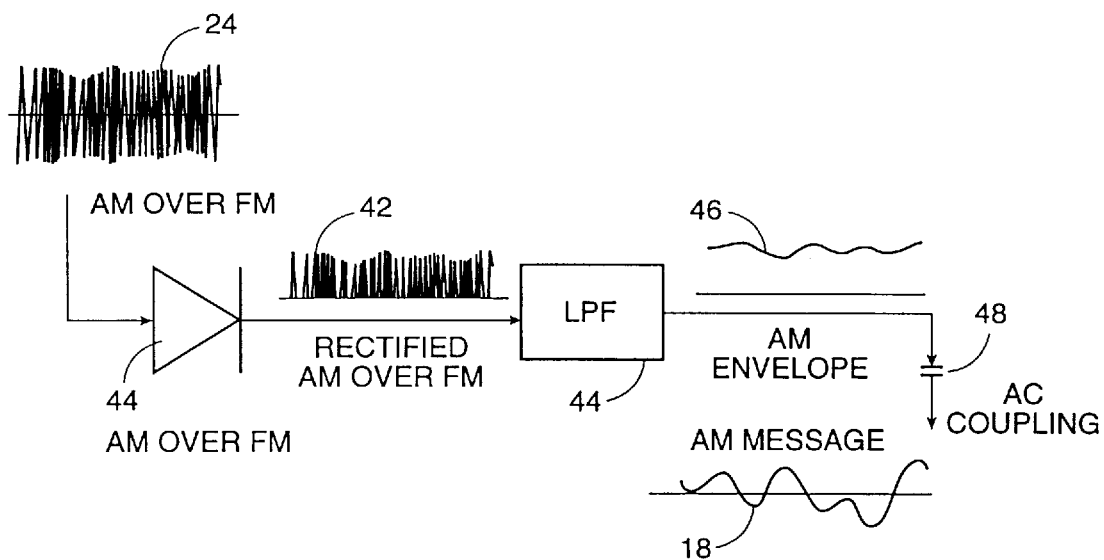
FIG. 3 illustrates the use of envelope detection for demodulating the AM component of AM over FM.

FIG. 3 illustrates an envelope detector used for demodulating the AM component of AM over FM 24. The AM over FM waveform is rectified by diode 40, yielding a rectified version 42 of the AM over FM waveform. A low pass filter 44 is used to filter out the high frequency components, leaving the AM envelope 46. The AM envelope 46 in turn is AC coupled at 48 to yield the demodulated AM message 18.

Figure 4:
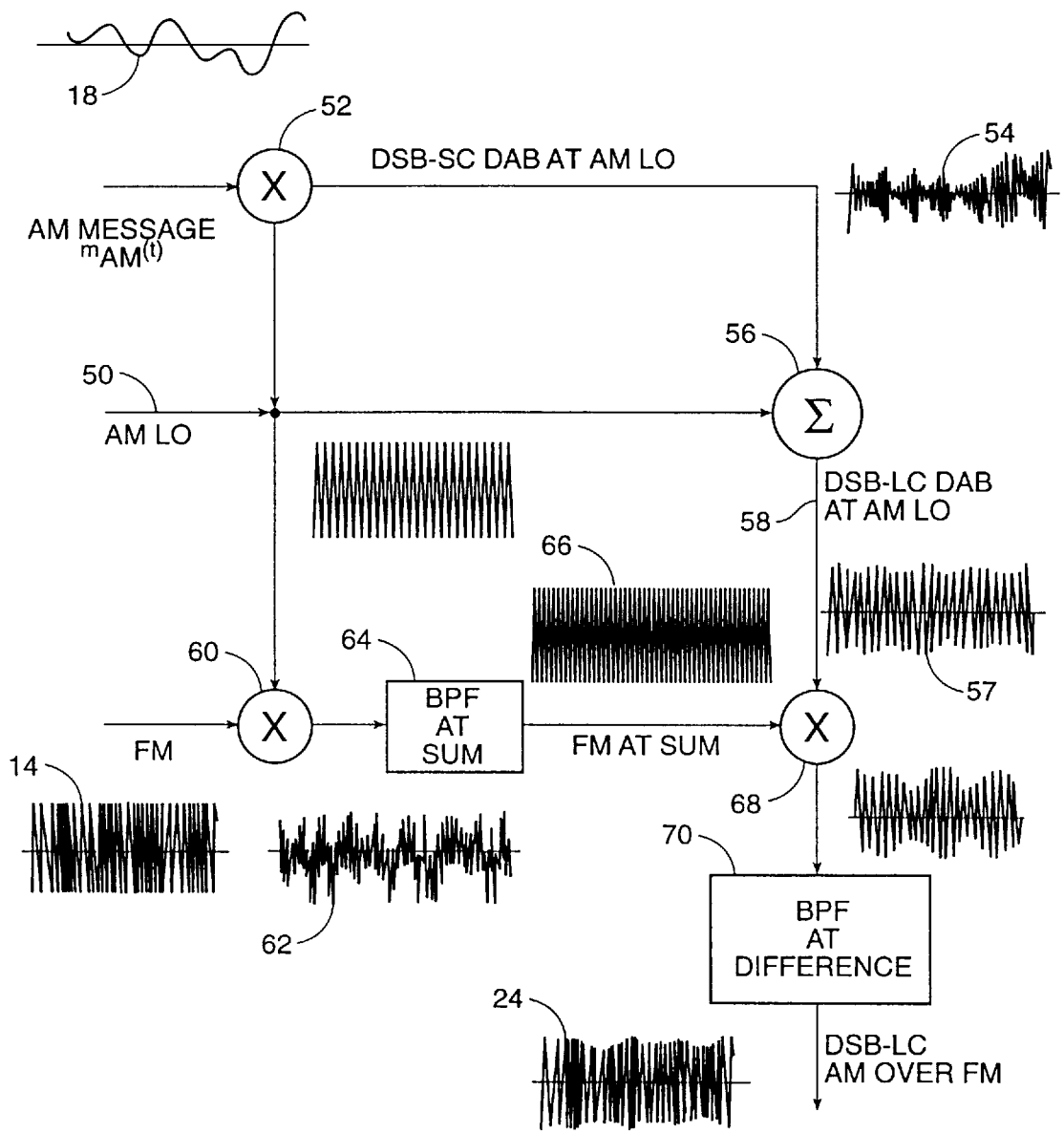
FIG. 4 illustrates the generation of AM over FM through frequency modulation of an AM waveform

An alternative method for combining FM and AM at the modulator is shown in FIG. 4. Whereas FIG. 1 illustrates the generation of AM over FM by amplitude modulating an FM waveform, FIG. 4 illustrates the generation of AM over FM by applying frequency modulation to an AM signal. In essence, then, this embodiment involves heterodyning the AM waveform with the FM waveform. The FM message is modulated into the FM waveform 14. A fixed frequency local oscillator ("LO") signal is generated at 50, and mixed with AM message signal 18 at mixer 52 to produce a double side band suppress carrier DAB signal 54 at the fixed LO frequency. The local oscillator signal 50 and the double side band suppress carrier DAB signal 54 are summed at 56 to produce a double side band large carrier DAB signal 57 at a stationary local oscillator frequency. The stationary local oscillator frequency also shifts the frequency of the FM waveform 14. This is accomplished by mixing at mixer 60 the local oscillator frequency with the FM signal to produce intermediate signal 62. Signal 62 is band pass filtered at 64 at the sum frequency to produce a frequency shifted FM waveform 66. The FM at sum frequency signal is used to shift the double side band large carrier DAB signal 57 to the frequency range of the original FM signal 14. This is accomplished by mixing the FM at sum signal 66 and the double side band large carrier DAB signal 57 in mixer 68, and then band pass filtering at 70 the resultant signal at the desired resulting frequency to produce a double side band large carrier AM over FM signal 24. The original FM signal 14 can be characterized as a $F_1+\delta F$ signal. The FM at sum signal 66 can then be characterized as $F_1+\delta F+F_2$, where $F_2$ is the frequency of the stationary Lo signal 50. Finally, the output signal is then $F_1+\delta F+F_2-F_2$ which is equal to $F_1+\delta F$. This means that the amplitude modulation is applied over the FM signal and then returned to the original FM band of FM signal 14.

Figure 5:
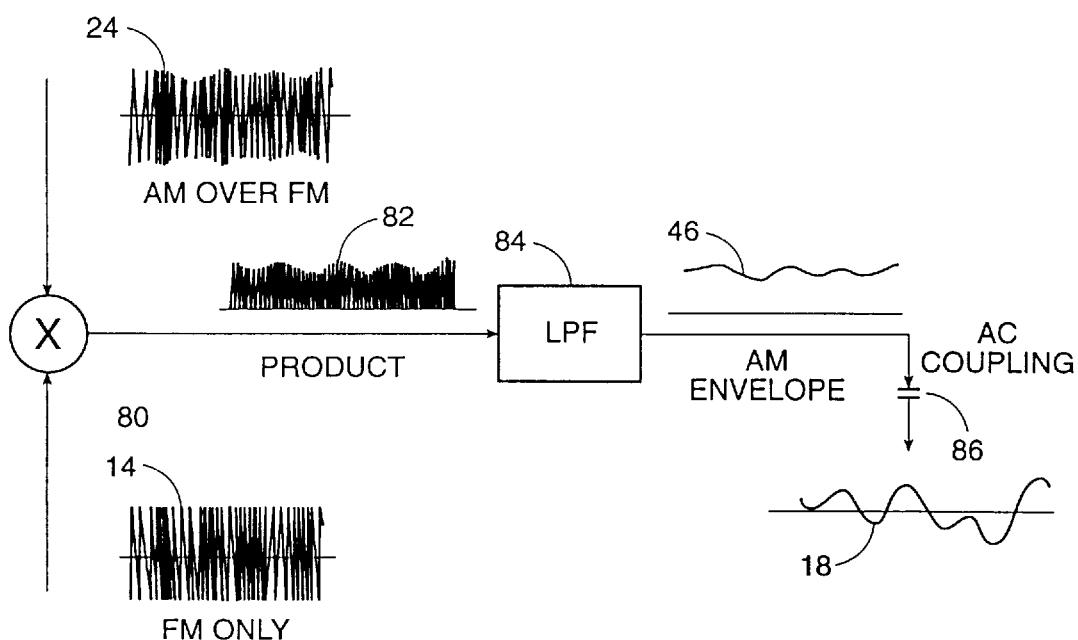
FIG. 5 illustrates the use of coherent detection for demodulating the AM component of AM over FM.

As best shown in FIG. 5, demodulation of the AM component of AM over FM 24 may be realized through a coherent AM demodulator. Coherent demodulation yields a better demodulation signal to noise ratio than envelope detection. For coherent demodulation, the AM over FM waveform 24 is multiplied at 80 by the FM waveform 14 isolated as shown in FIG. 2. The group delay in the direct AM over FM signal path going to the multiplier 80 should equal the group delay through the hard limiter 30 signal path which isolates the FM waveform 14 on its way to the multiplier. Differences between these group delays yields an FM discrimination component in the product 82 which interferes with the AM message. The product 82 is passed through a low pass filter 84 which yields AM envelope 46. AM envelope 46 is AC coupled at 86 to yield the AM demodulation waveform 18.

Figure 6:
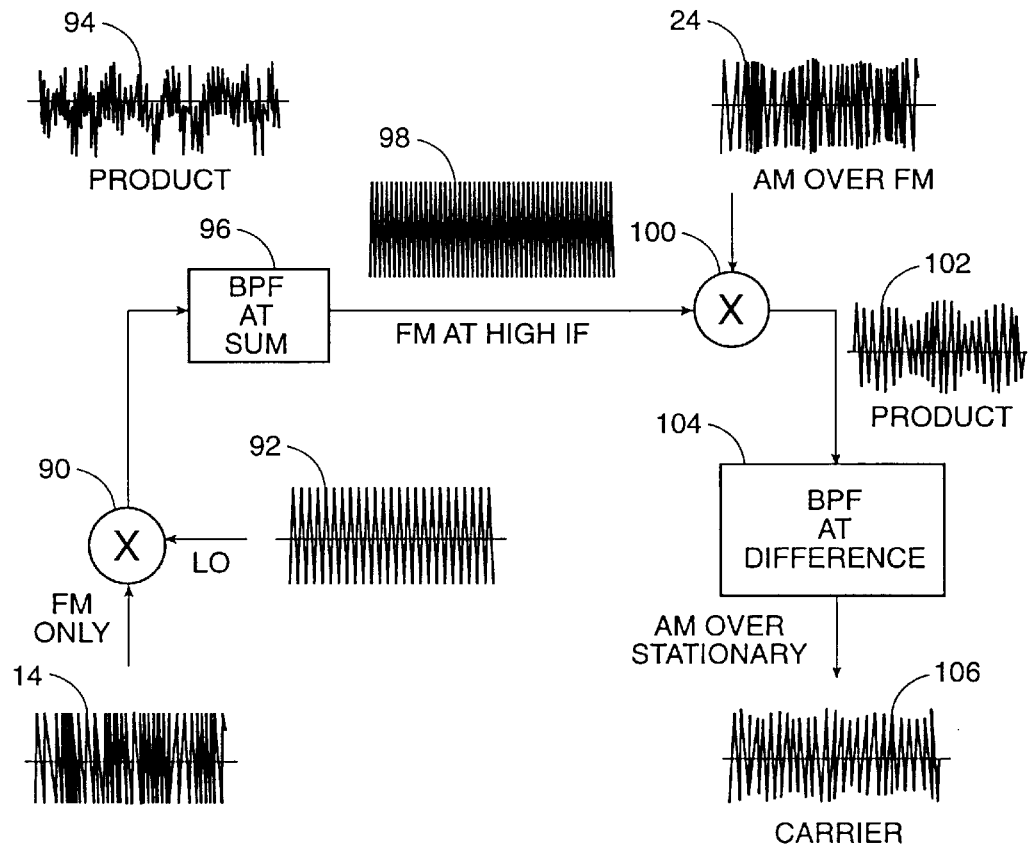
FIG. 6 illustrates the isolation of AM from AM over FM by conversion of AM over FM to AM over a constant frequency carrier.

AM detection signal to noise ratio may be further improved by isolating the AM modulation component to a carrier of constant frequency. This process is shown in FIG. 6. The isolated FM signal 14 is multiplied at 90 by a local oscillator (LO) signal 92 at some LO frequency $f_L$. The FM signal 14 may be thought of having instantaneous frequency $f_i(t)$ defined by $$f_i(t)=f_c+\Delta f_i(t) \qquad (1)$$

The product 94 is band pass filtered at 96 to isolate the sum frequency component around $f_c+f_L$. The resulting FM signal at a higher IF 98 has instantaneous frequency $f_{iHIGH}(t)$ defined by $$f_{iHIGH}(t)=f_c+f_L+\Delta f_i(t) \qquad (2)$$

This FM signal at the high IF 98 is multiplied at 100 by the received AM over FM waveform 24. The product 102 is band pass at filtered 104 around $f_L$, yielding signal 106 at the difference frequency $f_{diff}$. The difference frequency $f_{diff}(t)$ may be found by subtracting $f_i(t)$, the instantaneous frequency of the AM over FM signal 24 given in equation (1), from $f_{iHIGH}(t)$, the instantaneous frequency of the FM signal at the high IF 98 given in equation (2). The resulting difference frequency $f_{diff}(t)$ is shown to be $$\begin{aligned} f_{diff}(t) &= f_{iHIGH}(t) - f_i(t) \qquad (3)\\ &= [f_c + f_L + \Delta f_i(t)] - [f_c + \Delta f_i(t)]\\ &= f_L \end{aligned}$$

The signal 106 at $f_{diff}$ is therefore an AM signal at a carrier of constant frequency $f_L$. This AM signal may be demodulated using a conventional AM envelope detector or a conventional AM coherent detector.

Figure 7A:
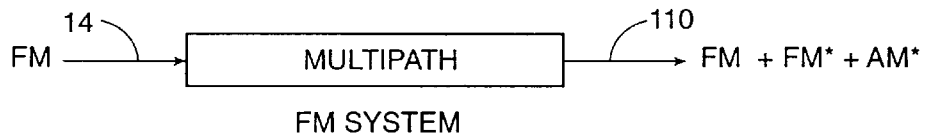
FIG. 7a, FIG. 7b, and FIG. 7c illustrates the multipath induced generation of interfering signals from AM waveforms, FM waveforms, and AM over FM.
Figure 7B:
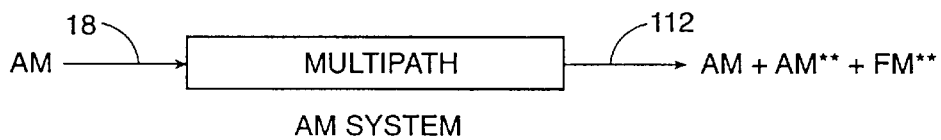
Figure 7C:

Multipath is known to induce distortion on FM signals, and manifests itself not only in the phase of the FM signal but also in the envelope of the FM signal. Similarly, multipath induces distortion on AM signals, which is additive to the AM signal envelope but also distorts the AM signal phase. In the case of AM over FM, distortion terms from AM and FM both interfere with each of the desired messages. This compound interference scenario is illustrated in FIG. 7. In FIG. 7a, multipath is shown to degrade FM 14 into FM plus additive interference components FM* and AM*, where * denotes interference caused by multipath originating in an FM signal. In FIG. 7b, multipath is shown to degrade AM 18 into AM plus additive interference components AM and. FM, where ** denotes interference caused by multipath originating in an AM signal. FIG. 7c illustrates the case of AM over FM 24, where FM degrades into FM plus FM* and AM* while AM degrades into AM plus AM and FM. In multipath reception of AM over FM, AM reception is degraded by interfering terms AM**, which originates in the AM signal, and AM*, which originates in the FM signal. At the same time, FM reception is degraded by interfering terms FM*, which originates in the FM signal, and FM**, which originates in the AM signal. The orthogonality between AM and FM signaling breaks down in multipath. However, several measures may be taken to alleviate this breakdown.

One method for decoupling the AM over FM interference between AM and FM is to mutually isolate the spectra of the two programs. As an example, the FM program could occupy a spectrum from DC to 60 kHz, while the AM program would occupy a spectrum from 75 kHz to 300 kHz. The AM and FM signals would be isolated in their spectra over and above the isolation inherent in the orthogonal signaling (orthogonality which breaks down in multipath).

Another method for mitigating interference due to multipath is the application of preemphasis and deemphasis to the AM program. This method assumes that the AM modulation index is very small. This assumption implies that FM yields large multipath induced interferers FM* and AM*, while AM yields small multipath induced interferers fm and am. AM preemphasis and deemphasis has the effect of mitigating AM*.

Figure 8:
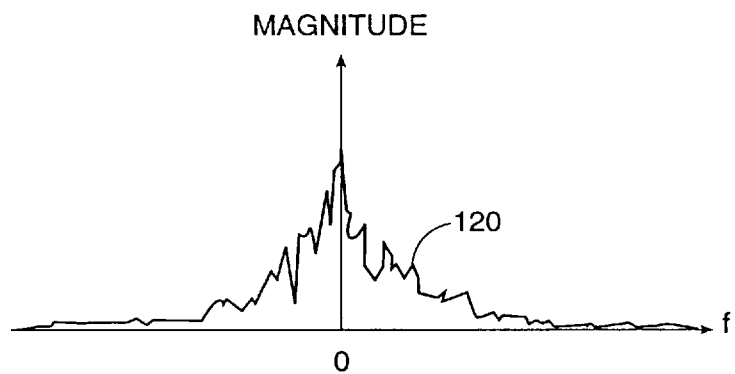
FIG. 8 illustrates an example of the spectrum of a signal, generated by multipath induced FM to AM conversion, which interferes with AM demodulation.
Figure 9:
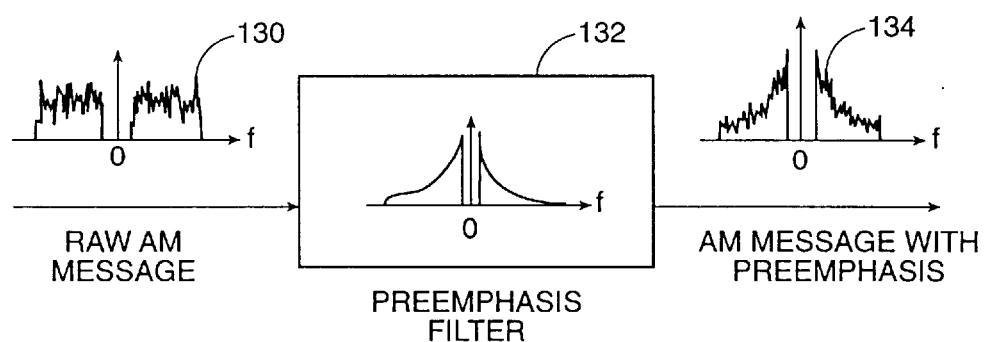
FIG. 9 illustrates the application of preemphasis at the transmitter to the AM program in the interest of mitigating possible multipath induced FM to AM conversion interference at the receiver.
Figure 10:
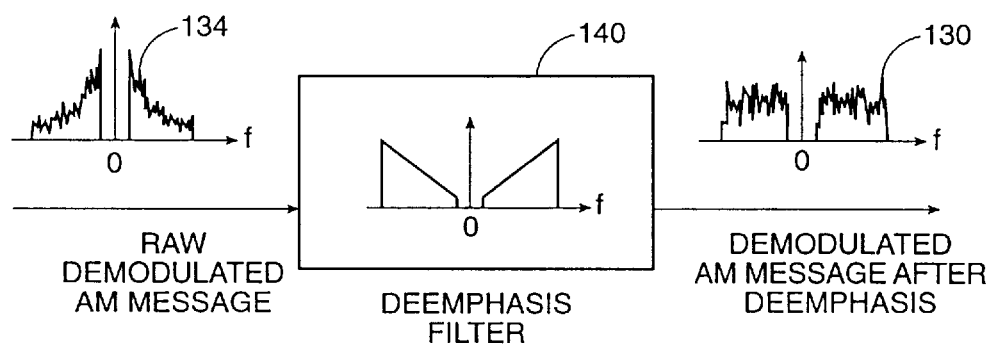
FIG. 10 illustrates the application of deemphasis at the receiver to the demodulated AM program in the interest of mitigating possible multipath induced FM to AM conversion interference.

The spectrum of multipath induced FM to AM conversion interference resembles the spectrum 120 of FIG. 8. The FM to AM conversion interference is more significant at lower frequencies than at higher frequencies. FIG. 9 illustrates the application of preemphasis at the transmitter, where a raw AM message 130 is passed through a preemphasis filter 132 on its way to the AM modulator. The preemphasis filter amplifies the low frequencies in the message with respect to the high frequencies in the message so as to allow the low frequencies to more easily overcome relatively higher levels of FM to AM conversion interference 120. FIG. 10 illustrates the application of deemphasis at the receiver. The raw demodulated AM message 134 is passed through the deemphasis filter 140 which attenuates higher levels of FM to AM conversion interference 120 in the process of correcting the distortion on the message 130 induced by the preemphasis filter 132.

The application of preemphasis and deemphasis to the AM program is compatible with the spectral isolation of the AM program from the FM program. Furthermore, the expected shape of the magnitude spectrum of AM*, such as the one shown in FIG. 8, may be used to derive optimum preemphasis and deemphasis functions, optimal cutoff frequencies for spectral isolation, or optimal combinations of both.

Figure 11:
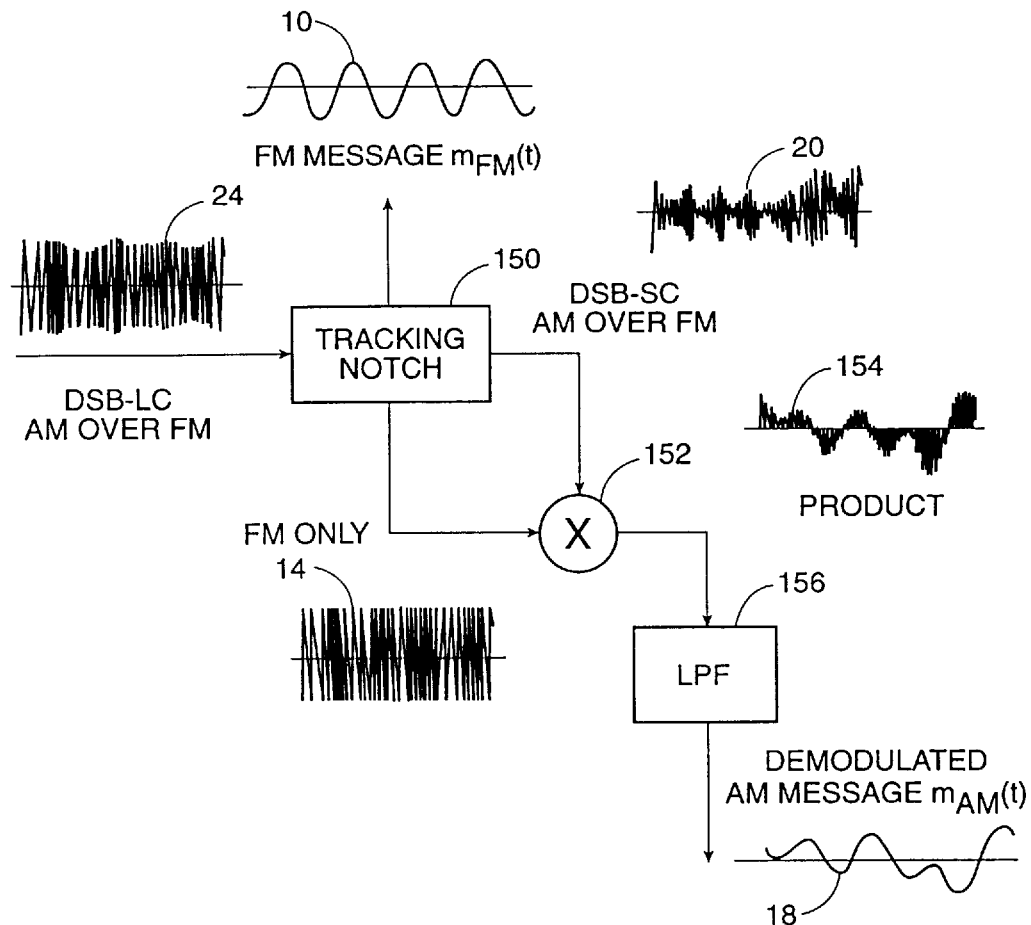
FIG. 11 illustrates the demodulation of both FM and AM programs by using a tracking notch filter.

The AM and FM may be demodulated individually through the use of a tracking notch filter as shown in FIG. 11. A tracking notch filter 150 accepts AM over FM 24 as input, and tracks the instantaneous frequency of the input 24 with the instantaneous frequency of the tracking notch 150. The FM message 10 is demodulated in the process of tracking the instantaneous frequency of the input 24. The output of the tracking notch 150 is an AM over FM signal with the carrier removed (DSB-SC AM over FM) 20. This may be multiplied at 152 by FM only 14 to yield a product 154 whose baseband component, isolated through low pass filtering at 156, is the demodulated AM message 18.

Figure 12:
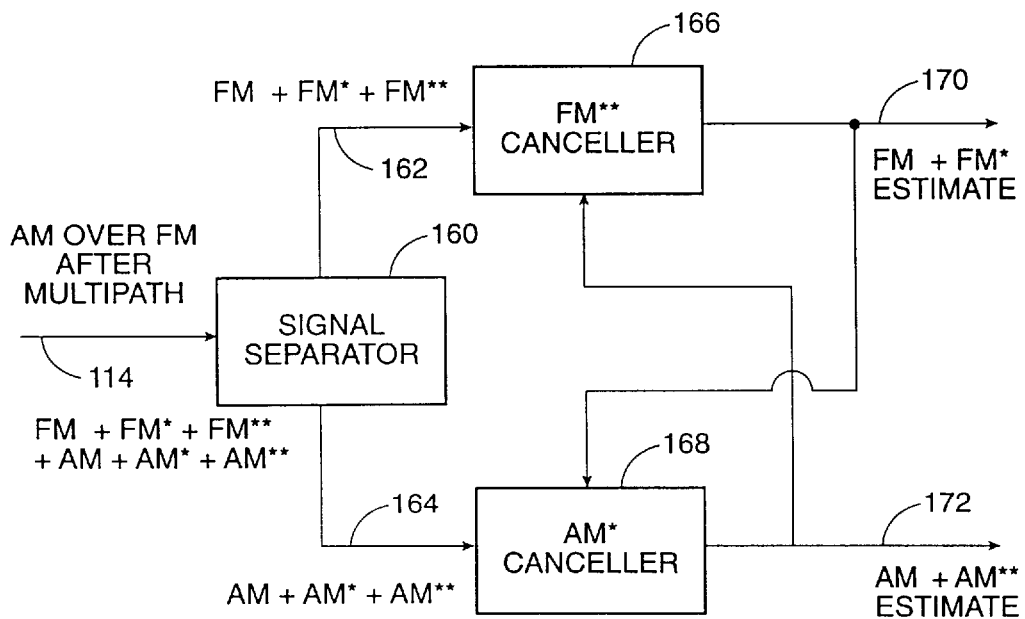
FIG. 12 illustrates the cancellation of multipath induced AM over FM cross-interference terms.

Tracking notch demodulation, or signal separation in general, may be used in conjunction with cancellation techniques to mitigate the additive interference terms induced by multipath. The AM over FM 24 signal after multipath may be separated by signal separators 160 into FM+FM*+FM** component 162 and AM+AM*+AM** component 164. In particular, AM* 163 may be removed from AM+AM*+AM 164 and FM 161 may be removed from FM+FM*+FM 162 using cancellation techniques illustrated in FIG. 12. To cancel FM 161 from FM+FM*+FM 162, the estimate of AM+AM 172 is used as an interference reference in an adaptive FM** canceler 166. The result, an estimate of FM+FM 170, is applied as an interference reference to the AM* canceler 168. The AM* canceler is an adaptive interference canceler designed to remove AM* 163 from AM+AM*+AM** 164.

The outputs of the cross-interference cancelers 166 and 168 are FM+FM* 170 and AM+AM** 172. Conventional equalization techniques may be used to extract FM from FM+FM* 170 and AM from AM+AM** 172. Furthermore, information derived from the cross-interference cancellation process illustrated in FIG. 12 may be employed to improve the performance of the equalizers which follow it. Thus, cross-interference cancellation techniques may restore the orthogonality between the AM and FM components of the AM over FM signal.

B) IBOC DB: In-Band On-Channel Digital Broadcast

Portions of this description are written without reference to audio. However, for those portions in which audio is discussed, it is to be noted that other non-audio applications may be served by the same methods and structures. Therefore, the acronyms IBOC FM-DAB and IBOC FM-DB are roughly interchangeable.

1) Transmission of IBOC FM-DB waveform
   a) DAB waveform, designed to enable separation of the analog FM and digital programs while both are being received in the same band at the same time.

Figure 13:
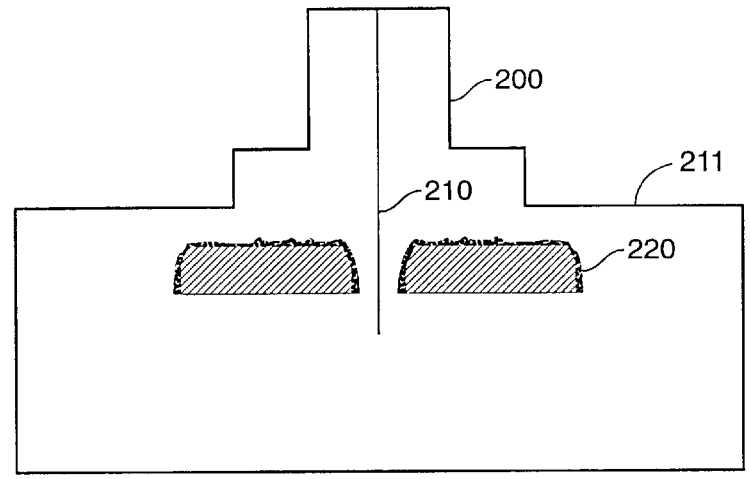
FIG. 13 illustrates a spectral representation of the plurality of DAB channels on either side of the analog FM program signal.

Turning now to a more narrow embodiment of the present invention, directed to in-band on-channel digital audio broadcast, FIG. 13 illustrates digital data subchannels 220 arrayed around analog FM carrier 210 within the spectral mask 200 licensed to a given broadcaster. In the context of AM over FM discussed above, the digital data subchannels 220 are the AM message signal 18 modulated onto the FM signal 10. The digital data waveform frequencies are tied to the instantaneous frequency of the analog carrier using the AM over FM modulation method and slew with the carrier from one end of the spectral mass to another.

Figure 14:
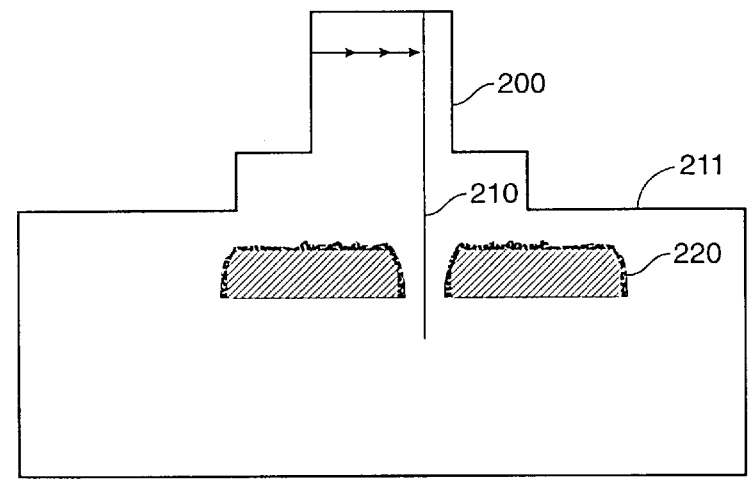
FIG. 14 illustrates how the DAB channels slew in frequency with the FM program signal.
Figure 15:
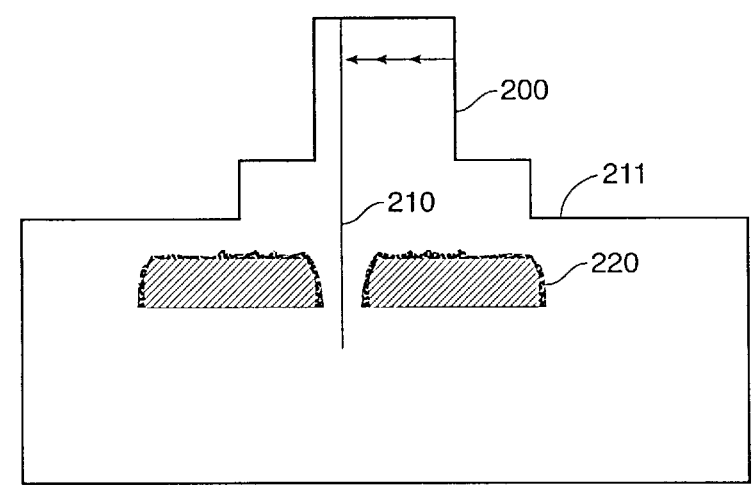
FIG. 15 illustrates how the DAB channels slew in frequency with the FM program signal.

In FIG. 14, the digital data channels 220 have slewed across the band in lock step with the instantaneous analog FM frequency 210. In FIG. 15, the data channels 220 have slewed from end to end within the licensed spectral mask 200. The digital data channels 220 do not exceed the spectral limitations which make up part of the license.

Figure 16:
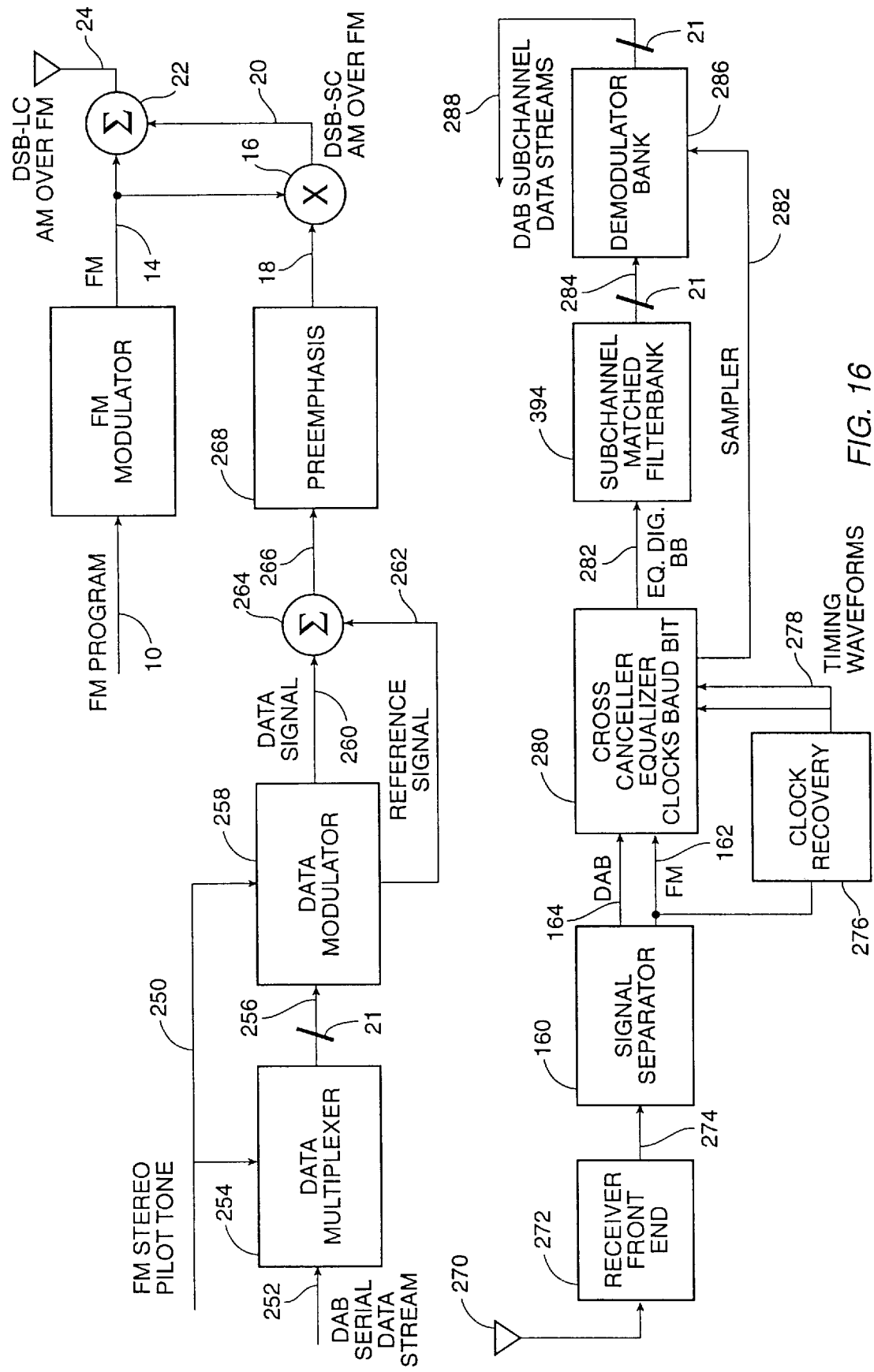
FIG. 16 illustrates the baseline IBOC FM-DAB system in block diagram form.

FIG. 16 illustrates a baseline system block diagram for in-band on-channel digital audio broadcasting in conjunction with commercial FM. FIG. 16 incorporates the concepts discussed generally as AM over FM into a more narrowly defined in-band on-channel FM DAB embodiment.

The FM-DAB transmitter block diagram is shown in the top half of FIG. 16. A DAB serial data stream 252 is demultiplexed at 254 into 21 parallel subchannel data streams 256. Streams 256 are modulated into data subchannels 260 by data modulator 258. Data demultiplexing 254 and subchannel modulation 258 are synchronized to the 19 kHz FM stereo pilot tone 250. The data modulator 258 also generates a reference signal 262 which is also synchronized to the 19 kHz FM stereo pilot tone 250. The data modulation waveform 260 and reference waveform 262 are added at 264 and their sum 266 is applied to preemphasis filter 268. The resulting DAB composite waveform 18 serves as an "AM message" for AM over FM modulation. AM over FM is generated in FIG. 16 in the same way that it is illustrated in FIG. 1.

The FM-DAB receiver block diagram is shown in the bottom half of FIG. 16. The transmitted AM over FM signal 24 is subject to multipath and additive channel noise on its way to the receiver. The resulting input waveform 270 is applied to the receiver front end section 272, which selects the appropriate channel and converts it to an IF frequency 274. The AM over FM signal 24 at the intermediate frequency (IF) 274 is processed by a signal separator 160, which implements tracking notch demodulation of the FM signal 162 and the DAB (AM) signal 164, as shown in FIG. 11. The tracking notch filter in the signal separator 160 also applies deemphasis, as best shown in FIG. 10, to the recovered AM composite. The raw demodulated baseband (BB) FM message 162 may be applied to an FM stereo demodulator to recover the conventional analog FM audio program. Baseband FM signal 162 is also applied to clock recovery circuit 276 to extract timing waveforms from the 19 kHz FM stereo pilot 250. The timing waveforms 278, raw demodulated FM message 162, and raw digital baseband demodulated AM composite 164 are applied to cross canceler equalizer 280.

Cross canceler equalizer 280 performs two functions. The first is cancellation of FM to AM components in the recovered AM message waveform. Cross cancellation is done in three steps. The first step is correlation of average levels of the AM message waveform 164 as a function of instantaneous FM frequency indicated by the demodulated FM program 162. An averaged mapping is generated of AM interference voltage against FM demodulation voltage. Averaging is possible because the FM program is uncorrelated to the AM program. The mapping is continuously averaged and updated. The second step is to estimate the FM to AM interference signal by applying the FM demodulation voltage 162 as an input to the mapping function. The third step is to subtract the FM to AM conversion interference estimate from the raw recovered AM signal 164. FM to AM conversion interference is the result of signal multipath distortions. FM to AM conversion interference canceling is discussed in greater detail below.

The second function of the cross canceler equalizer 280 is multipath equalization. Multipath equalization takes advantage of the transmitted reference signal 262 included in the DAB composite 266. An adaptive linear combiner continuously trains on the reference signal 262 which is present in the DAB composite 266. The equalizer implements a least mean squares (LMS) algorithm to continuously adapt its equalization operation into synchronization with the timing waveforms derived from the 19 kHz FM stereo pilot 250.

The output of the cross canceler equalizer 280 is an equalized digital baseband composite signal 282. This DAB composite 282 is passed on to a subchannel matched filter bank 394 which implements matched filters for the 21 subchannels 256. The matched filtered waveforms 284 are in turn passed on to a bank of 21 subchannel demodulators which recover the 21 parallel DAB subchannel data streams 288. These in turn may be multiplexed into a final recovered DAB serial data stream.

The DAB serial data stream may then be processed in outboard high fidelity stereo decoding hardware for listener use.

The following broadcast parameters have been chosen for IBOC-DAB:

FM MODULATION

Corresponds to commercial FM as described in FCC 73.317. Existing FM broadcasting will not change. It should be noted that commercial FM broadcasts are known to far exceed the spectral mask requirements given in FCC 73.317. This means that FM broadcasters are known to be much more careful about their allocations than they have to be.

AM MESSAGE

Consists of 21 subcarriers carrying a total of 399 kilobits per second of data. The first subcarrier is at 9.5 kHz. Subsequent subcarriers are spaced at 9.5 kHz intervals. The last subcarrier is at 199.5 kHz. Added to this is a pilot waveform.

AM PREEMPHASIS

Consists firstly of weighting the power of each of the 21 subcarriers by a factor of $f^{.55}$ before modulation of the subcarriers. Consists secondly of an analog integration (take the mathematical integral) of the modulated composite (includes the pilot reference waveform). The net result is that subcarrier power is weighted by $f^{1.65}$.

MODULATION SPECTRUM

Complies with FCC 73.317. The smallest DAB subcarrier, at 199.5 kHz, has −44 dBc power upon transmission. The largest DAB subcarrier, at 9.5 kHz, has −30 dBc power. Total AM subcarrier power is −17 dBc. Most of this power is within 120 kHz of the center frequency of the allocation. FCC 73.317 requires that transmitted power between ±120 and ±240 kHz be below −25 dBc. The scheme described transmits DAB power at −28 dBc, leaving a 50% margin. FCC 73.317 calls for less than −35 dBc from ±240 kHz to ±600 kHz. The scheme described transmits less than −45 dBc of DAB power in this interval.

CONVENTIONAL FM DEMODULATION

Is still fully operational. DAB via AM over FM is transparent to conventional FM demodulation techniques.

C) A multipath resistant transmitted Reference Data transmission system

In order to improve the quality and reliability of IBOC FM-DAB through multipath environments channelized data transmitted reference signaling may be used. This combines data subchannelization in the interest of increasing the baud interval with a transmitted reference that is shared by all data subchannels in order to equalize against multipath. Standard FM may also realize increases in multipath resistance from use of this system.

This system improves digital communication in the presence of multipath for a given bandwidth efficiency and with very fast multipath adaption time. This system combines data subchannelization with a transmitted reference signal which is shared by all the data subchannels for fast multipath equalization.

Figure 17:
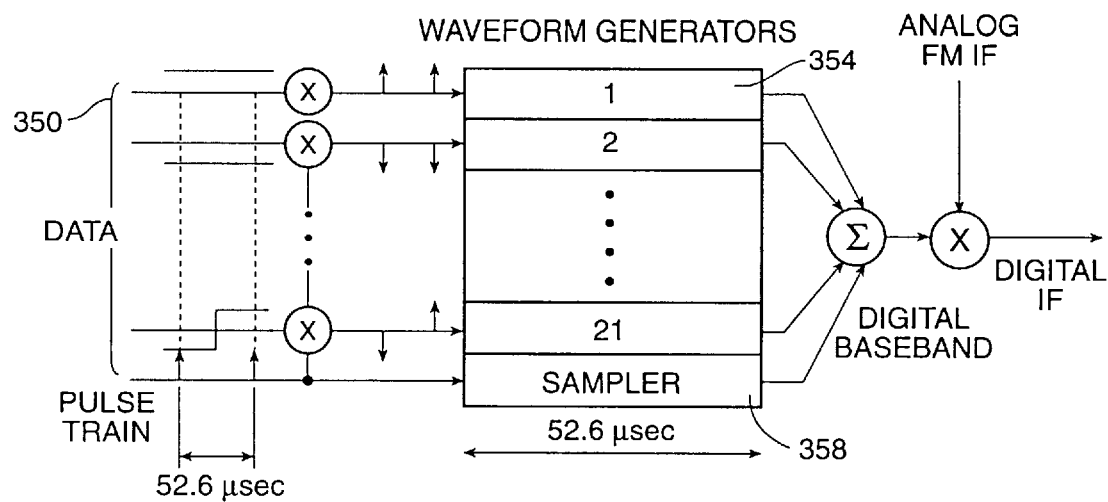
FIG. 17 illustrates the channelized data transmitted reference modulator.
Figure 18:
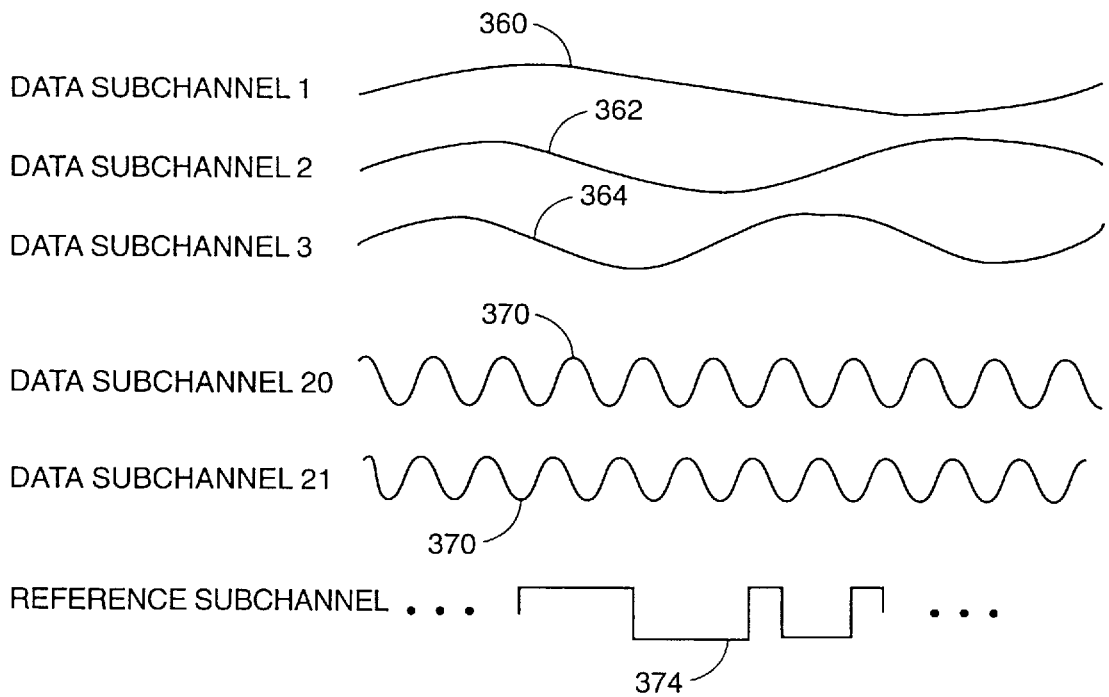
FIG. 18 illustrates a possible modulation symbol set for the channelized data transmitted reference modulator of FIG. 17.
Figure 19A:
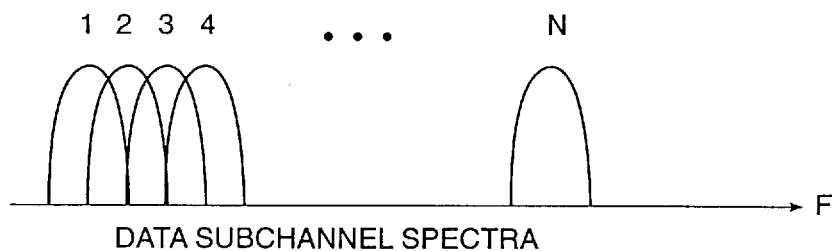
FIG. 19a and FIG. 19b illustrate the spectra of data and reference subchannels for the channelized data transmitted reference communication system.
Figure 19B:
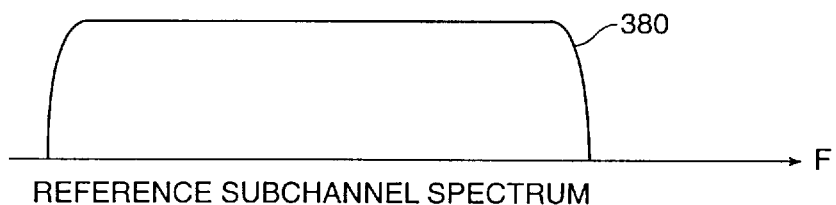

Channelized data transmitted reference modulation is illustrated in FIG. 17. Bipolar input data 350 is applied in parallel to a number of data subchannel waveform generators 354–358, which preferably are impulse response generators or finite impulse response (FIR) generators. 21 subchannels are used in FIG. 17, although a greater or fewer number may be used. Each bit of data applied to each waveform generator excites a modulation symbol specific to its respective subchannel. In every baud interval, one modulation symbol is generated for every subchannel with its polarity determined by its respective subchannel input data. In every baud interval, a reference symbol (denoted "Sampler" 358 in FIG. 17) is also generated with constant reference polarity. As an example, a modulation symbol set is illustrated in FIG. 18. In this example, each of the data subchannels 360–372, which correspond to the channels at the output of data demultiplexer 254 of FIG. 16, is shifted slightly in frequency from the previous data subchannel. Reference subchannel 374 (which corresponds to sampler 358) is wideband with respect to each data subchannel. The reference subchannel 374 has a spectral power distribution that overlaps the spectral power distribution of all the data subchannels, as best shown in FIG. 19. The reference spectrum 380 of FIG. 19b spans the spectrum of all the data subchannels of FIG. 19a.

Figure 20A:
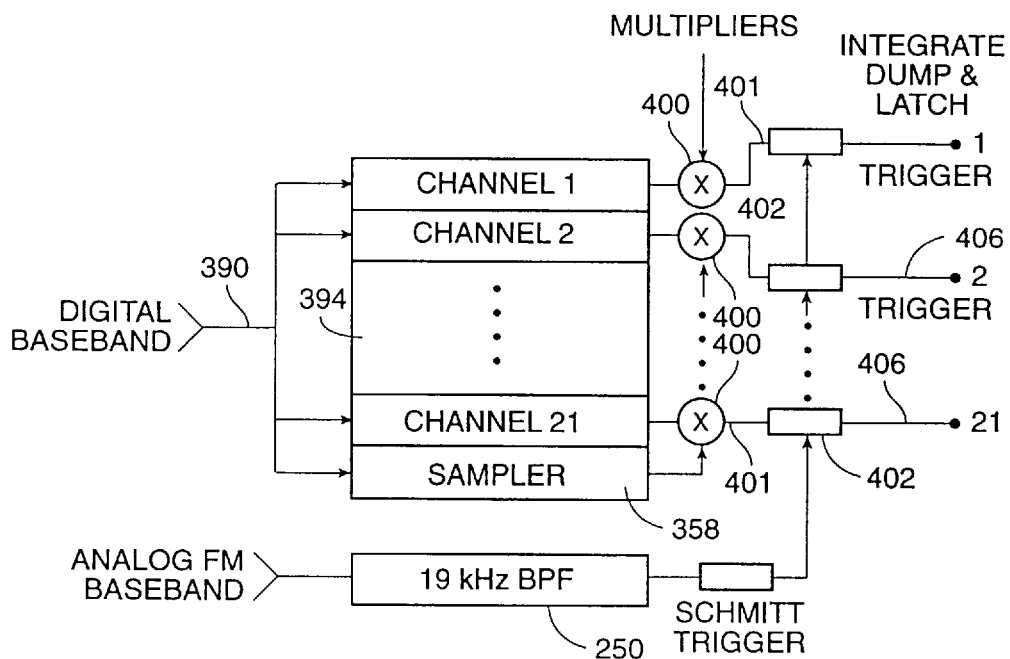
FIG. 20a and FIG. 20b are block diagrams for a channelized data transmitted reference self-sampling receiver.
Figure 20B:
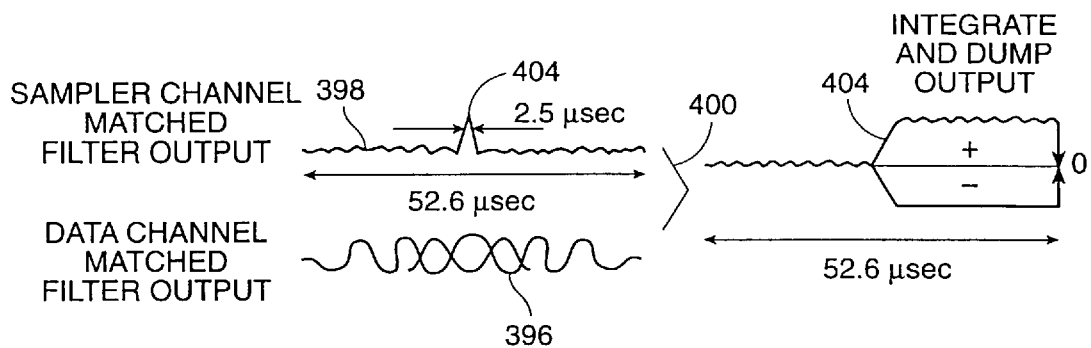

Data demodulation may be accomplished by using a self-sampling receiver as best shown in FIG. 20. In FIG. 20a, the received modulation waveform 390 is applied to a bank of subchannel matched filters 394. Data subchannels 360–372, which are narrowband with respect to the reference subchannel 380, convolve into wide time pulses 396 as best shown in FIG. 20b. The relatively wideband reference subchannel 380 convolves into a relatively narrow sampling pulse 398. The reference sampling pulse 398 is multiplied at multipliers 400 by the matched filter output. The result 401 reflects the polarity of the subchannel data symbol which reflects the polarity of the message data 350. A properly timed integrate and dump operation 402 integrates the product of the matched filtered reference and each subchannel over time 404 (2.5 $\mu$sec) when the sampling pulse 398 is present. The polarity of the resulting integrals yields the received data in each subchannel 406.

Figure 21A:
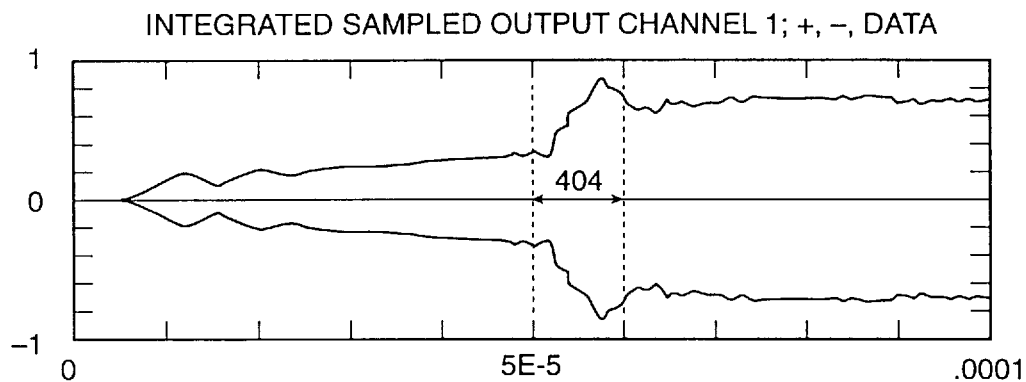
FIG. 21a and FIG. 21b illustrate clear channel data reception through the self-sampling receiver of FIG. 20.
Figure 21B:
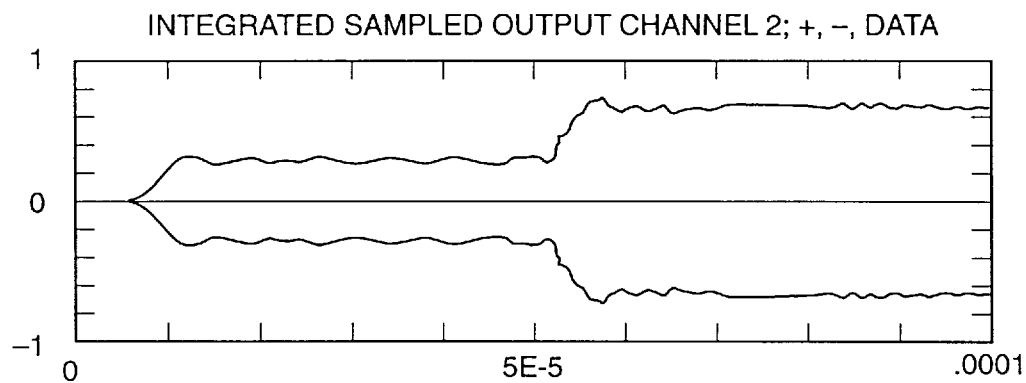
Figure 22A:
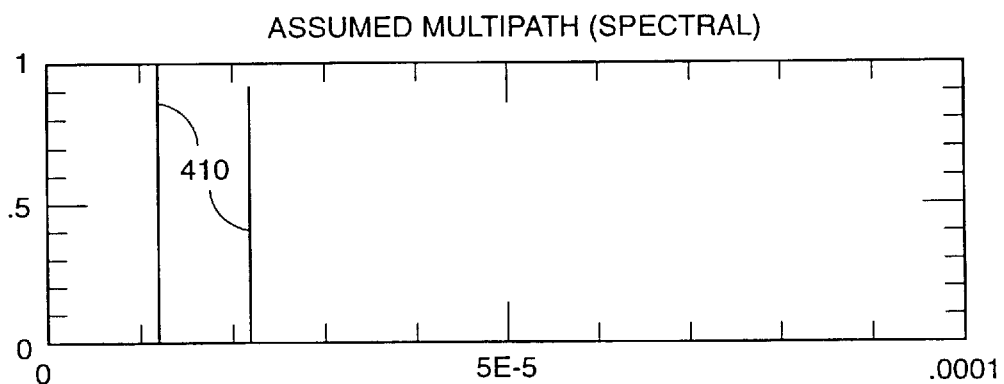
FIG. 22a and FIG. 22b illustrate two path channel data reception through the self-sampling receiver of FIG. 20.
Figure 22B:
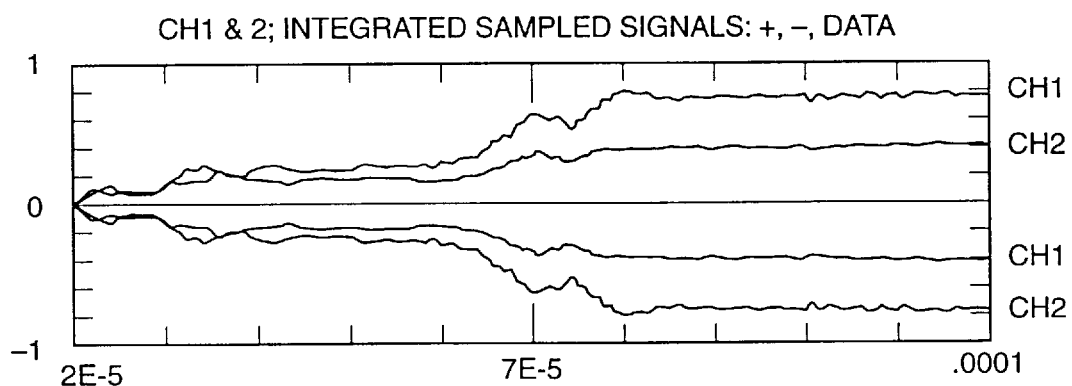

Clear channel simulation of the integrated data output is shown in FIG. 21a and FIG. 21b. Polarity of + and − data are clearly recovered. The advantage of channelized data transmitted reference modulation is shown in cases where multipath is present, and an example is shown in FIG. 22a. This simulation calls for a two path channel as shown in FIG. 22b. These two paths, delayed by about 10 microseconds in this example, cause a channel time response which may be modeled by a pair of impulses 410. These redundant channel paths cause distortion in the matched filter responses 396 at the demodulator. However, multiplication of the reference sampler 358 with the matched filter response correlates multipath delayed responses of the reference sampler with the matched filter responses of data subchannel matched filters. The integral of the products in FIG. 22b shows that this correlation allows for polarity to be coherently restored and successful + and − detection to take place.

Figure 23A:
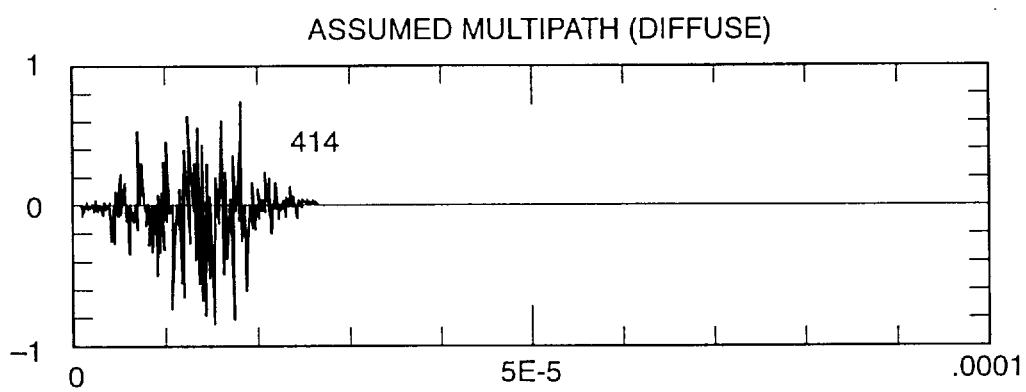
FIG. 23a and FIG. 23b illustrate diffuse multipath channel data reception through the self-sampling receiver of FIG. 20.
Figure 23B:
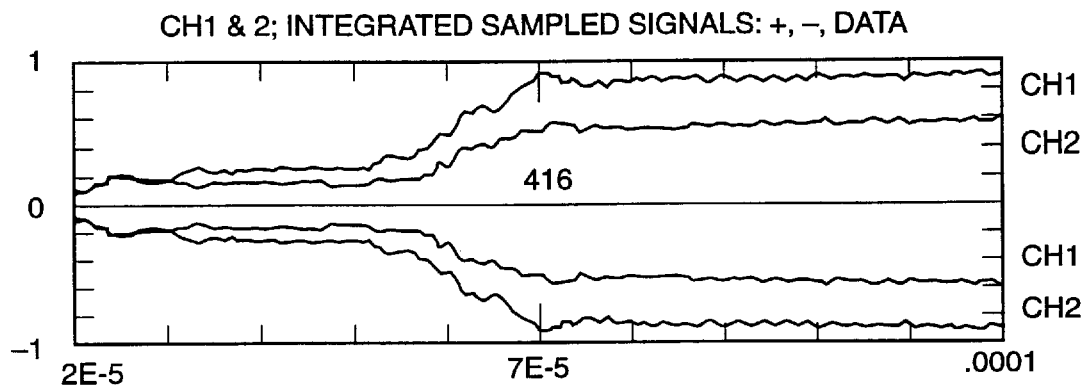

FIG. 23a illustrates a more extreme case of diffuse multipath 414. Although multipath is diffuse, inherent correlation of reference and data subchannel waveforms allow for coherent detection as shown in FIG. 23b at 416.

Figure 24:
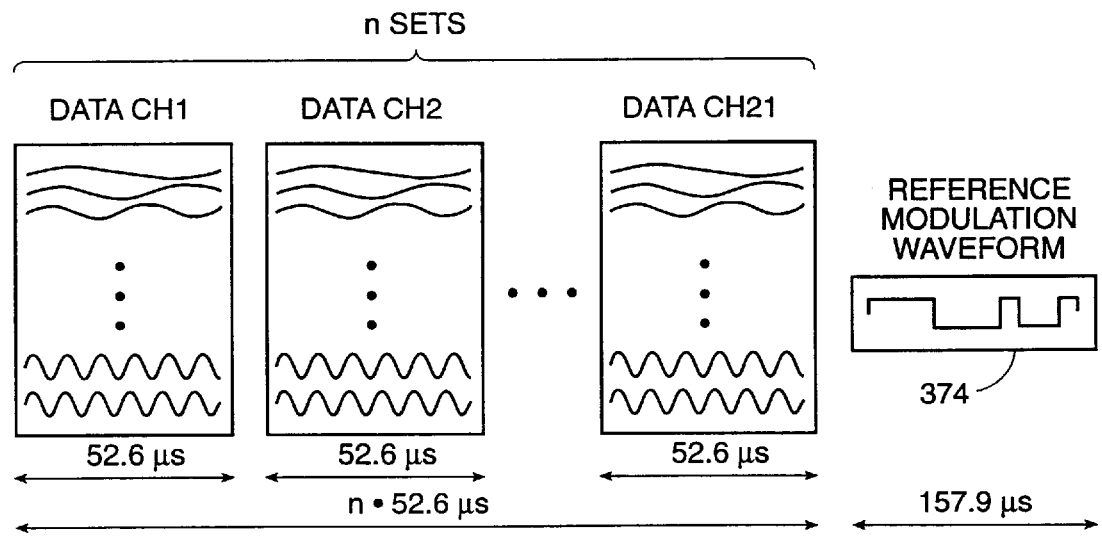
FIG. 24 illustrates time division multiplexing of a reference waveform with data subchannel waveforms.

A number of variations of the reference signal transmission system or its operation are possible, among them are: mutual orthogonality between subchannel modulation symbols alleviates cross-talk between subchannels; data subchannel modulation symbols may consist of mutually orthogonal chirp waveforms; data subchannel modulation symbols may consist of mutually orthogonal PN sequences; the reference waveform may consist of a PN sequence, a chirp, a pseudorandom noise burst or any waveform that overlaps all the data subchannels in spectral content; and, the reference may alternatively be time division multiplexed with the data as shown in FIG. 24.

Figure 25:
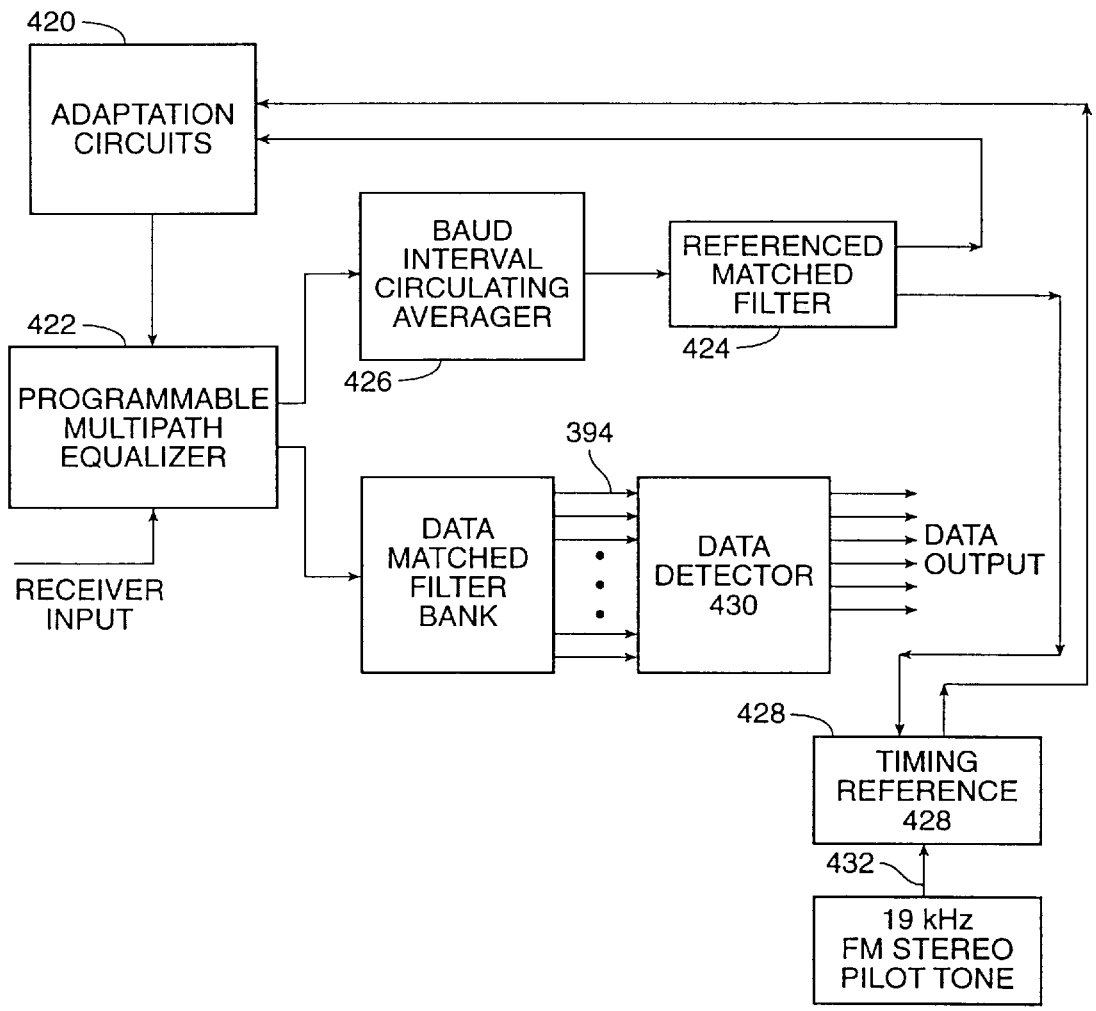
FIG. 25 is a block diagram of a channelized data transmitted reference equalizer receiver.

In the preferred embodiment for channelized data transmitted reference IBOC FM-DAB, 21 subchannel modulation waveforms are used. These are windowed tone bursts starting at 19 kHz and spaced at 9.5 kHz. The baud interval is 52.6 microseconds. Baud intervals are synchronized to the 19 kHz stereo pilot tone. The reference is a small component of each subchannel tone. A block diagram of the receiver is shown in FIG. 25. Rather than using the reference in a self-sampling mode, the reference may be used to continuously reprogram a quickly adaptive programmable multipath equalizer 422. In addition to matched filter 424, a baud interval circulating averager (IIR filter) 426 may be used to isolate the reference waveform 374 for equalization training 420. Equalization at 422 respects a timing reference 428 derived from the received 19 kHz FM stereo pilot tone 250.

Subchannelization works against multipath by extending the baud interval. For a given data rate, the baud interval is increased in proportion to the number of subchannels chosen. Increasing the baud interval to exceed the longest multipath delay spread is necessary for the reference to be valid for training equalization. Equalization is designed to take place within a single baud interval. The reference, periodic in a baud interval, does not equalize from one baud interval to the next. Increasing the baud interval to exceed the longest multipath delay spread limits multipath induced intersymbol interference to symbols in adjacent baud intervals. The number of data subchannels are chosen accordingly. For the case of in-band on-channel FM DAB, 52.6 microseconds exceeds any expected multipath delay spreads. This 52.6 microseconds, being the reciprocal of 19 kHz, also conveniently allows for synchronization to the 19 kHz FM stereo pilot 250.

Essential to multipath operation is the necessity of the reference to occupy the same spectrum as all the data subchannels. The fact that the same spectrum is used by the reference as the data makes the reference a valid reference waveform for sensing or characterizing the multipath seen by the subchannel data signals. In this respect, the transmitted waveform is a phase reference waveform valid for all the data subchannels. Channelization of the data makes possible duplicate use of the same reference for all data channels which improves the power efficiency of the transmitted reference.

The use of a reference 380 which is of wider bandwidth than any of the subchannels means that the reference correlates or match filters into a narrower pulse than any of the data subchannels. The bandwidth difference between the reference and any data subchannel enables pulse compression of the reference with respect to the data subchannels. This pulse compression allows the reference to be used as a phase correcting signal sampler for the reference channels in multipath.

D) Tracking Delay Element Notch Filter and FM Demodulator

The operation and structure of the tracking delay element notch filter and FM demodulator is now described. First, the delay element notch filter is described. Next, the operation of the variable delay element is treated. Then the operation of the phase detector is addressed. Then a closed loop cancellation system is discussed, including FM demodulation.

Delay Element Notch Filter

Figure 26:
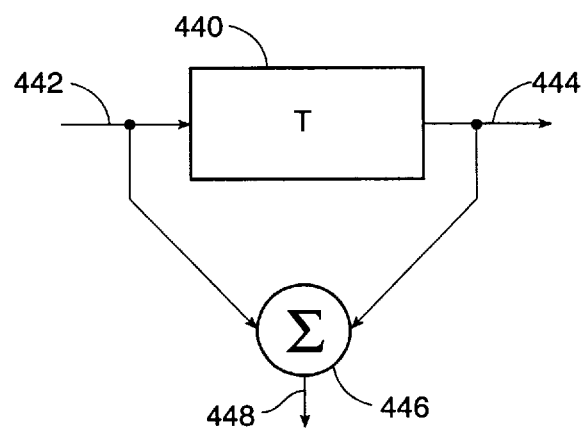
FIG. 26 is a simplified delay element canceler.

A simplified delay element notch filter is illustrated in FIG. 26. A single delay element 440 provides a delay T. The signals at the input 442 and at the output 444 of the delay element are added in summer 446. The signal 448 at the output of summer 446 reflects the application of a set of notches to the input signal 442.

Figure 27:
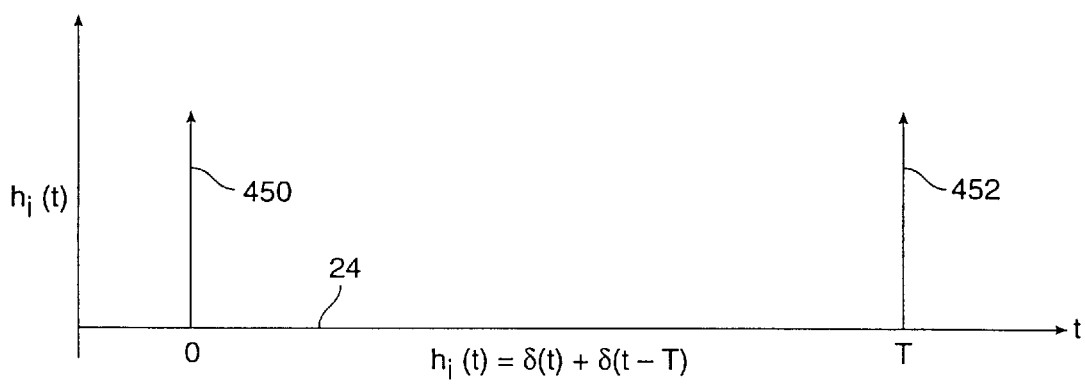
FIG. 27 illustrates the time response of the canceler of FIG. 26.

The time impulse response of the delay element notch filter of FIG. 26 is shown in FIG. 27. The impulse 450 at t=0 represents the component at the output 448 of the summer 446 due to the input signal 442 of delay element 440. The impulse 452 at t=T represents the component at the output 448 of the summer 446 due to the output signal 444 of delay element 440. The time impulse response $h_i(t)$ 454 of the delay element notch filter 440 is $$h_i(t) = \delta(t) + \delta(t-T) \qquad (4)$$

The frequency response $H_i(f)$ of the delay element notch filter is evaluated by taking the Fourier transform of its time impulse response $h_i(t)$. The result is $$|H_i(f)| = |\cos(\pi f T)| \qquad (5)$$

Figure 28:
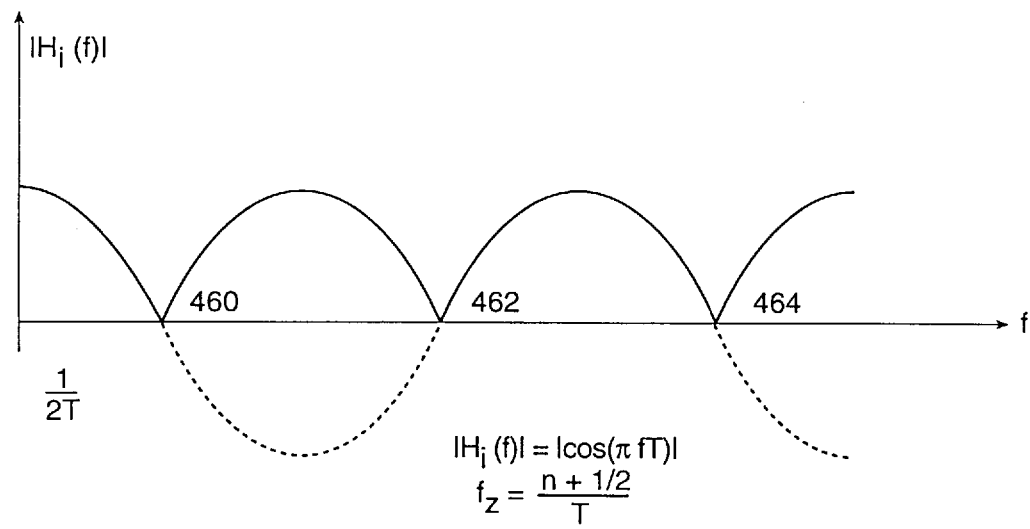
FIG. 28 shows the theoretical wideband frequency response of the FIG. 26 canceler.

$H_i(f)$ is depicted in FIG. 28 and contains many notches, of which notches 460, 462, 464 are illustrated. These notches are also referred to as nulls or spectral zeroes $f_z$. The first spectral zero 460 is at $f_z = \frac{1}{2}/T$, and the rest 462, 464, et seq. are spaced at intervals of 1/T. The location of the n'th null $f_z$ may be found using $$f_r = \frac{n + 1/2}{T} \qquad (6)$$

, where n may take on integer values of 0 and greater.

Narrowband operation of a simple delay element notch filter lends itself to the analysis of isolated notches. The narrowband perspective of the delay element notch response $H_i(f)$ is given in FIG. 29.

Narrowband operation lends itself to simple approximations. A narrowband approximation for $H_i(f)$ is found by taking the two term Taylor expansion of $H_i(f)$ in Eqn. 5 about $f_z$ 470. The result 472, shown in FIG. 29, is $$|H_i(f)| = |\sin(\pi(f-f_z)T)| = \pi|f-f_z|T \qquad (7)$$

Figure 29:
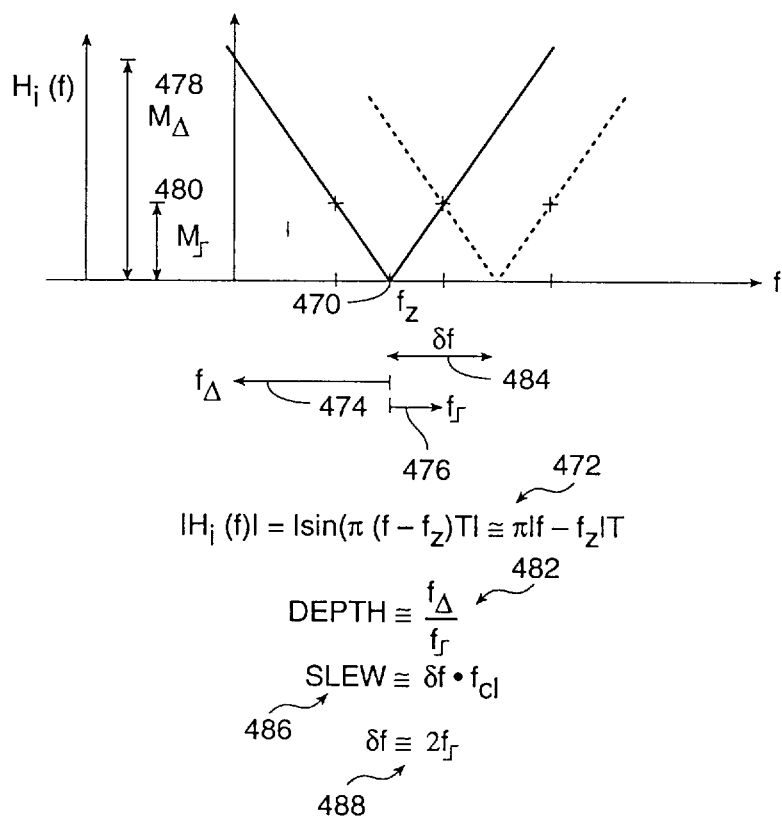
FIG. 29 shows the theoretical narrowband frequency response of the FIG. 26 canceler and gives some fundamental equations which describe canceler operation.

Consider a signal of interest separated from the notch frequency $f_z$ 470 by a frequency offset $f_\Delta$, 474, as shown in FIG. 29. Suppose also that the notch were positioned to within an offset of $f_I$ 476 from the frequency of the interference signal to be cancelled. Following the linear approximation 472 of $H_i(f)$, the ratio of the attenuation $M_\Delta$ 478 seen by the signal of interest to the nominal attenuation $M_I$ 480 seen by the interference signal is equal to the ratio of the frequency offsets 474 and 476. FIG. 29 defines relative depth 482 of the notch, in equation form, to be $$\text{DEPTH} = \frac{M_\Delta}{M_I} = \frac{f_\Delta}{f_I} \qquad (8)$$

Equation 8 describes the way tracking accuracy affects cancellation depth in a tracking canceler.

FIG. 29 also illustrates limitations on tracking speed relevant to the case of a simple digitally tracking system. In a simple digitally tracking system, the notch frequency $f_z$ 470 would be changed in increments of $\delta f$ 484. The interference frequency would be measured periodically at some clock rate $f_{cl}$, which would also be used to update $f_z$ 470. If the notch frequency $f_z$ 470 could be moved by the increment $\delta f$ 484 once every cycle of the clock $f_{cl}$ then the fastest rate at which the notch frequency could be moved would be the SLEW 486, or $$\text{SLEW} = \delta f \cdot f_I \qquad (9)$$

Consider that the interference frequency is detected and tracked in discrete increments. Then $f_I$ 476 in FIG. 29 would serve as a frequency offset threshold. If, at the detection time, the interference frequency were offset from the notch frequency $f_z$ 470 by more than $f_I$ 476, then the notch frequency $f_z$ 470 would be either incremented or decremented by $\delta f$ 484. Otherwise, if the interference frequency were offset from the notch frequency $f_z$ 470 by less than $f_I$ 476, then the notch frequency $f_z$ 470 would remain the same during the next period of the update clock $f_{cl}$. Under this condition, the most accurate tracking occurs when the threshold $f_I$ 476 and the increment $\delta f$ 484 are related at 488 so that $$\delta f = 2 f_I \qquad (10)$$

Variable Delay Element

The simplified delay element notch filter illustrated in FIG. 26 employs a delay element 440 of delay T. FIG. 28 illustrates that the notch frequency $f_z$ is dependent upon the delay T. The delay T must be changed in order to change the notch frequency $f_z$. Changes $\Delta f_z$ in the notch frequency $f_z$ are related to changes $\Delta T$ in the time delay T through $$\frac{\Delta f_s}{f_z} = \frac{\Delta T}{T} = \frac{f_z}{n + 1/2} \Delta T \qquad (11)$$

To change the cancellation frequency $f_z$ 470, it is necessary to adjust the delay T 440. The preferred embodiment for implementing an adjustable delay T 440 between a reference point 442 and a delay point 444 is to use groups of taps in a tapped delay line. One group of taps implements an adjustable reference group delay corresponding to 442, whereas the second tap group implements an adjustable longer overall group delay corresponding to 444. The relative delay T 440 between these two tap groups may be adjusted by adjusting the absolute delays of each or both delay groups with respect to one another.

Figure 30A:
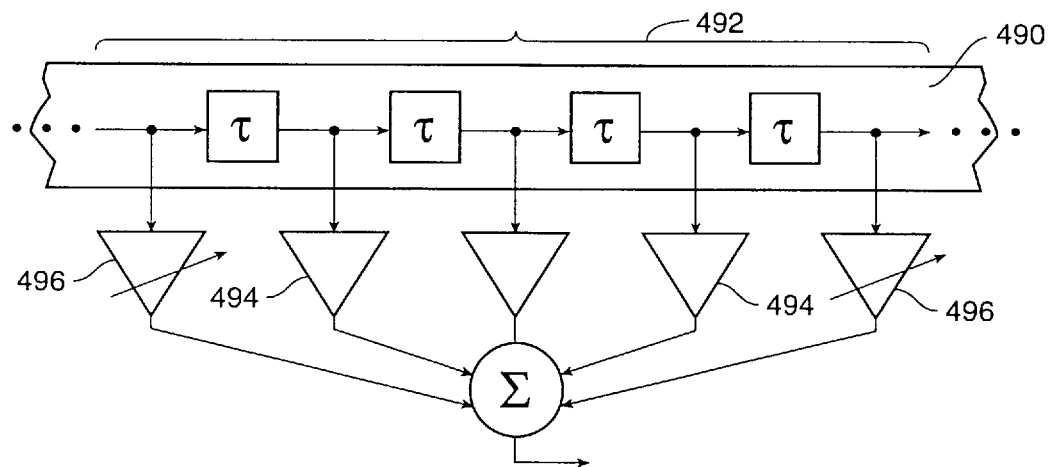
FIG. 30a illustrates the architecture of and FIG. 30b and FIG. 30c illustrate two approaches for choosing tap weights for finite impulse response (FIR) filter variable delay elements.
Figure 30B:
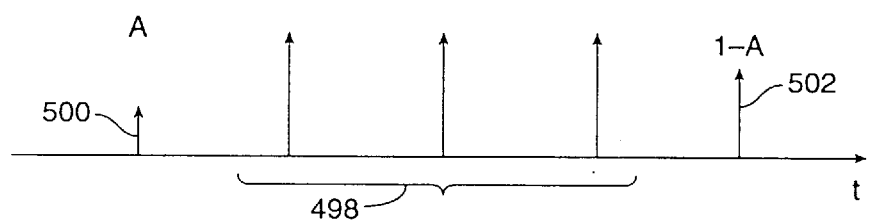
Figure 30C:
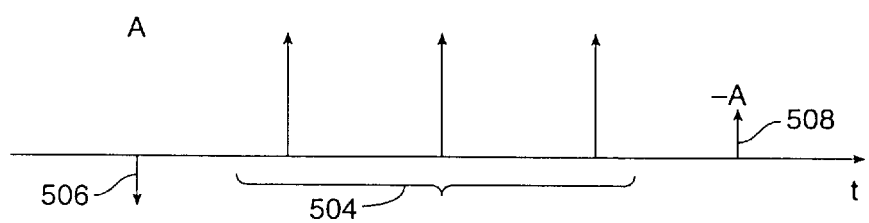

A group of taps, configured as a single variable delay element, is shown in FIG. 30a. Transversal filter tap configurations which implement easily adjustable delay elements are shown in FIGS. 30b and 30c. In FIGS. 30b and 30c, each impulse (arrow) represents the output of a single tap in a transversal filter tap group.

A variable delay element consists of a group of closely spaced taps in a delay line 490 which together form a composite delay 492. Taps 494, 498 and 504 are static, and taps 496, 500, 502, 506 and 508 are dynamic. The static taps 494, 498 and 504 maintain constant tap weights, and dynamic taps 496, 500, 502, 506 and 508 change in weight, and vary the delay.

FIG. 30b illustrates a tap weight scheme for a variable delay element employing complementary positive dynamic taps. The three static taps 498 are full amplitude. The dynamic taps 500 and 502 are always positive, and vary in a complementary fashion. "Complementary fashion" means that if one dynamic tap has amplitude A, where 0<A<1, then the other has amplitude 1-A. For a baseline delay, the dynamic taps 500 and 502 are set to half amplitude. For the minimum delay, the first dynamic tap 500 is set to full amplitude and the second dynamic tap 502 is set to zero amplitude. For the maximum delay, the first dynamic tap 500 is set to zero amplitude and the second dynamic tap 502 is set to full amplitude. Delay may be varied continuously by varying the dynamic taps 500 and 502 continuously in this complementary fashion. As 500 is lowered, 502 is raised and the delay is raised. As 500 is raised, 502 is lowered and the delay is lowered. The delay varies very linearly with the values of the dynamic taps. Delay offset as a function of dynamic tap weight may be approximated theoretically from the phase of the tap group with respect to the center of the tap group.

FIG. 30c illustrates a variable delay element employing dynamic taps of opposite sign. "Opposite sign" means that if one dynamic tap implements a weight of A, then the other dynamic tap implements a weight of −A. The three static taps 504 in FIG. 30c are full amplitude, and the dynamic taps 506 and 508 are always of opposite sign and may vary continuously. For a baseline delay, the dynamic taps 506 and 508 are set to zero. For the minimum delay, the first dynamic tap 506 is set to full positive amplitude and the second dynamic tap 508 is set to full negative amplitude. For the maximum delay, the first dynamic tap 506 is set to full negative amplitude and the second dynamic tap 508 is set to full positive amplitude. Delay may be varied continuously by varying the dynamic taps 506 and 508 continuously in this complementary fashion. As 506 is lowered, 508 is raised and the delay is raised. As 506 is raised, 508 is lowered and the delay is lowered. The delay varies very linearly with the values of the dynamic taps. Delay offset as a function of dynamic tap weight may again be approximated theoretically from the phase of the tap group with respect to the center of the tap group.

A preferred embodiment of the tapped delay line of FIG. 30a is one employing an acoustic charge transport (ACT) device. ACT devices are discussed in Hunsinger et al., U.S. Pat. No. 4,633,285, which is incorporated herein by reference.

Figure 48:
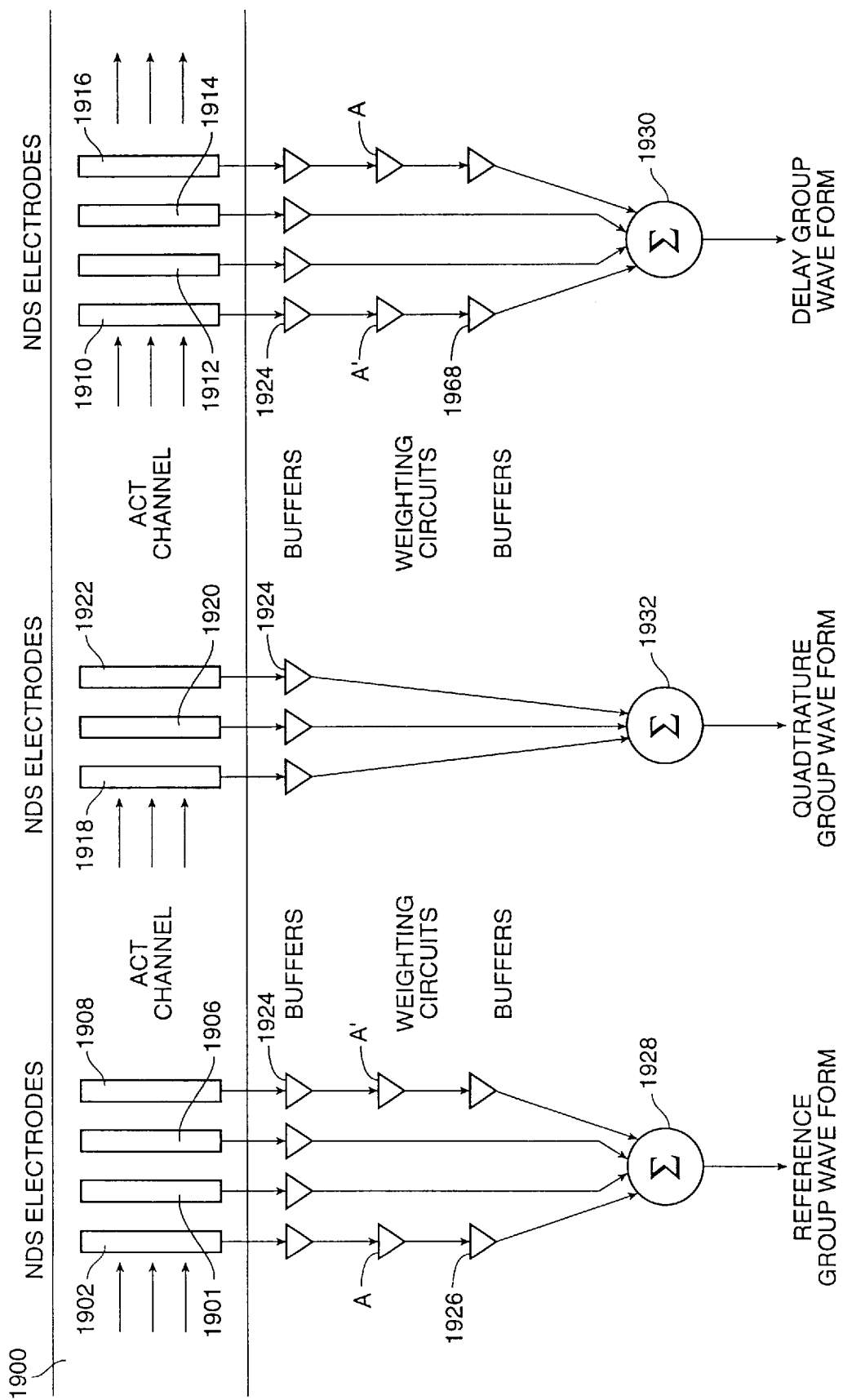
FIG. 48 is a schematic diagram of an ACT-based notch filter according to the invention.

The ACT tapped delay line may implement a programmable transversal filter (PTF) through the addition of on-chip tap-weighting and memory circuits and may be used as a notch filter by appropriate control of the taps. A notch filter based upon ACT tapped delay line is shown in FIG. 48. The weighting of the taps is accomplished through the use of programmable attenuators that set the magnitude of the coefficient. The accumulation function required by the transversal filter is performed by two summing busses; these busses are connected to the inverting and the noninverting inputs of an off-chip differential amplifier in order to permit bipolar tap weighting. The tap weights are stored in on-chip static random-access memory (SRAM). In order to change the response of the filter, the user simply supplies a data word containing the desired coefficient, the address of the tap to be loaded, and an enable signal at the time the change is desired. For further information on an ACT-based PTF, see The ACT Programmable Transversal Filter, Microwave Journal, May 1991.

High-speed transversal filters are now available through a technology known as acoustic charge transport or ACT, which combines the speed and simplicity of analog components with the programmability and delay capability of digital processing. This technology allows the practical implementation of transversal filters which operate over a frequency range of 500 kHz to 180 MHz, providing several hundred parallel delays over a range of several nanoseconds to several microseconds. For applications requiring fast updating of the filter response, ACT filters with update times of less than 100 nsec have been demonstrated.

Figure 43:
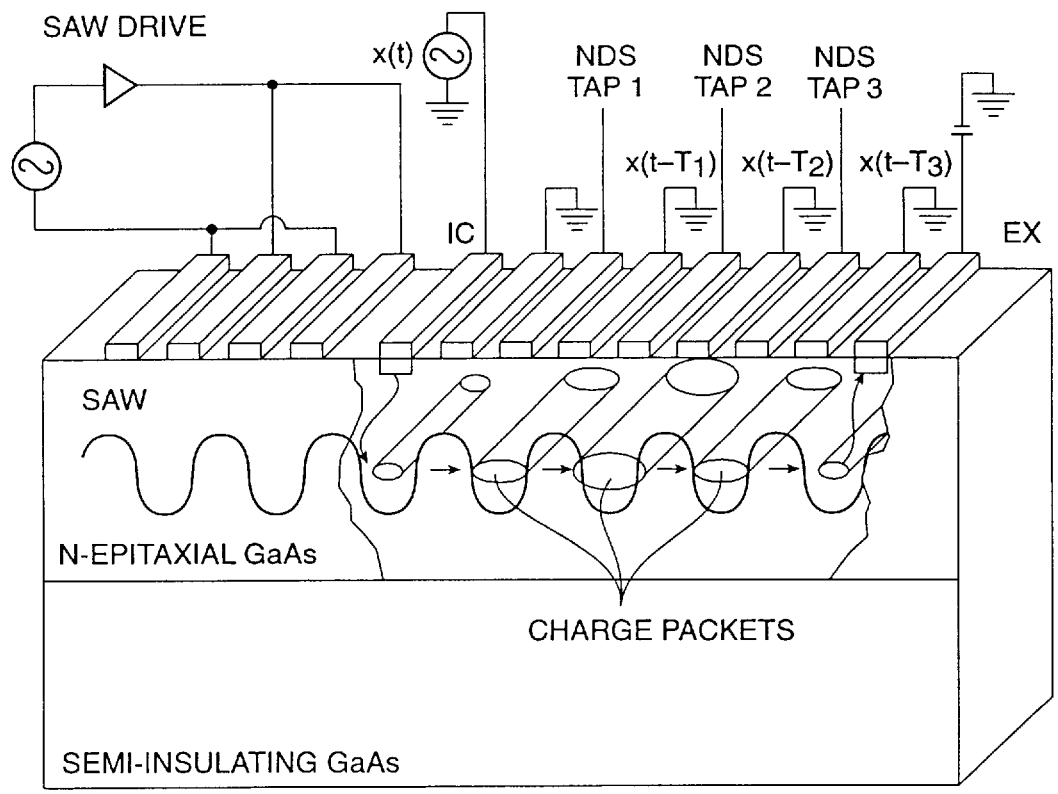
FIG. 43 illustrates a cross sectional slice of an acoustic charged transport (ACT) tapped delay line.

An ACT device is an analog delay line in which discrete samples of an input signal are formed as a series of charge packets that propagate in a depleted transport channel induced in a GaAs substrate, as shown in FIG. 43. Hunsinger et al., U.S. Pat. No. 4,633,285 discloses an ACT-based delay line and the disclosure therein is incorporated herein by reference. These charge packets are formed and transported by electric fields that arise from piezoelectric coupling to a propagating surface acoustic wave (SAW) which is generated directly on the piezoelectric GaAs substrate. Unlike the operation of conventional SAW devices, the ACT device employs the SAW only as a parametric pump or "clock"; all signal information is contained in the propagating charge packets rather than in the SAW. This obviates the deleterious effects of various acoustic phenomena which are observed in SAW devices, because these effects do not directly interact with the charge packets.

The charge packets are confined within a transport channel formed in an epitaxial surface layer having a thickness that is an appreciable fraction of the SAW wavelength at the clock frequency. This architecture isolates the charge packets from interfacial traps at the substrate surface and epitaxial layer interface. Thus, ACT devices operate in a deep "buried-channel" mode, and exhibit extremely high transport efficiencies at clock frequencies that are easily achieved in the UHF region (300 to 1000 MHz). The excellent transport efficiency at UHF clock rates forms the basis for a variety of high speed, high performance analog signal processors using ACT technology.

The phenomenon leading to charge packet formation in the input section of an ACT device results in an intrinsically high performance sampling operation. Effective aperture times have been measured to be less than ten percent of a clock period leading to precise sample formation and the potential for providing frequency conversion directly in the ACT device.

An image charge is induced in arbitrary metal features fabricated within the propagation path that allows the amount of charge in each packet to be sensed without affecting the contents of the packet. This enables the realization of high performance tapped delay line structures that form the basis for a rich set of analog signal processors.

The fabrication of ACT devices is amenable to the integration of GaAs integrated circuit elements to provide interface and control functions. The potential for providing delay and completely integrated RF signal processing functions is unprecedented.

Figure 44:
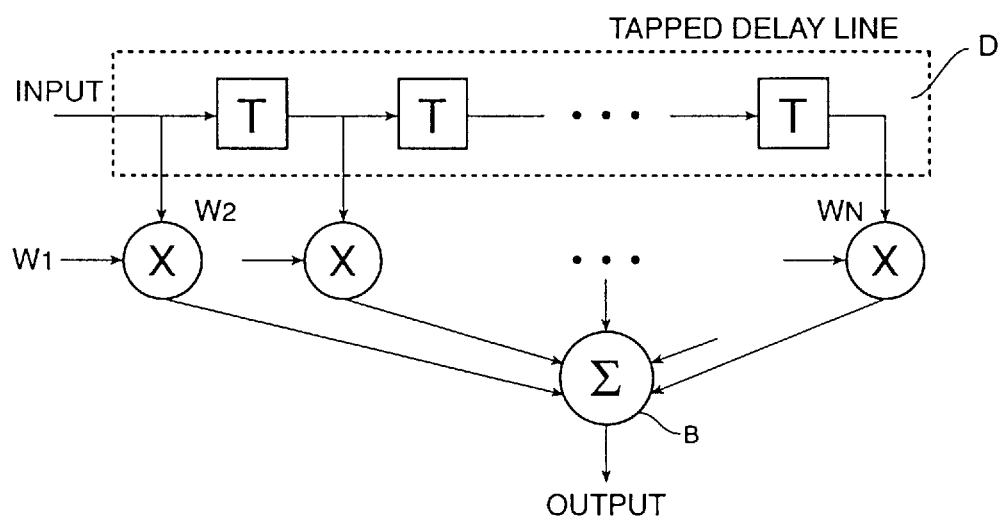
FIG. 44 illustrates a transversal filter utilizing an ACT delay line.

One of the most useful applications of the delay and sensing functions inherent to the ACT device is in the transversal filter. The classical transversal filter is shown in FIG. 44. In this device an input signal is processed by passing it through a sequence of delay elements. After each delay element, the signal is sensed, weighted by a predetermined coefficient, and sent to an accumulator. The original signal is passed through another delay element, a different weighting coefficient is applied, and the result is sent to the accumulator. This cycle of delay, sense, weight, and accumulate is repeated in each stage of the filter. The signals from each tap add coherently when the signs of the weighting coefficients match the phase of the input signal and a large signal appears on the output terminal of the filter.

The programmable transversal filter of FIG. 44 uses an ACT tapped delay line to accomplish the delay and sensing operations required by the transversal filter. The nondestructive sensing electrodes T sense the input signal as it propagates down the delay line D, Each sensing tap T is connected to a common summing bus B (the accumulator of the transversal filter) through an individual programmable attenuator. The values of the attenuators (the weighting coefficients) are set by a digital controller. All tap weights W are stored in random access memory (RAM which is monolithically integrated with the ACT delay line.

An ACT programmable transversal filter has 128 taps that may be set to any of 31 values between +1 and −1 (5-bit tap weighting). The input sampling rate of the device is 360 MHz, and the center to center tap spacing is 5.6 ns. This gives a single-tap bandwidth of 180 MHz, and a filter Nyquist interval of 90 MHz. A single tap may be programmed in less than 1 µs, and the entire device may be programmed in under 100 µs.

FIG. 48 illustrates a notch filter utilized in the IBOC FM-DAB receiver as the tracking notch 150 of FIG. 11. Notch filter N has an ACT transport channel 1900, with SAW generation, input and output pursuant to U.S. Pat. No. 4,633,285. Three groups of non-destructive sense (NDS) electrodes or taps are spaced along the surface of channel 1900 for sensing the charge packets moving through the channel with the SAW.

NDS taps 1902, 1904, 1906, and 1908 are positioned at the input end of channel 1900 and are the reference taps. NDS taps 1910, 1912, 1914, and 1916 are at the output end of channel 1900 and are the delay taps. NDS taps 1918, 1920, and 1922 are disposed between the reference and delay tap groups and are used to provide a quadrature waveform for use by the phase detector.

Buffer circuits 1924, more particularly explained later, are connected to the output of the taps of the reference, delay, and quadrature groups. Taps 1904, 1906 of the reference group are static, as are taps 1912, 1914 of the delay group. Taps 1902 and 1904 are dynamic and adjustable as a result of tap weight control voltages A and A', respectively. Similarly, taps 1910 and 1916 are dynamic and adjustable as a result of tap weight control voltages A' and A, respectively.

Buffer circuits 1926, which correspond to buffer circuits 1924, are connected to outputs of the weighting circuits of the adjustable taps 1902, 1908, and 1910, 1916. Summers 1928, 1930, and 1932 are then connected to the outputs from the static and dynamic taps of the reference, delay, and quadrature tap groups, respectively.

The reference and delay tap groups are spaced 700 nanoseconds apart in an ACT channel. Each of these tap groups consist of four buffered NDS electrodes. The center two electrodes in each of these tap groups are the static taps and the outside electrodes are the dynamic taps. Weighting circuits in the dynamic taps—as well as buffer circuits for all taps—are taken from FIG. 33. The dynamic taps in the reference and delay groups cause the relative group delay between their summed outputs to increase and decrease. An additional quadrature tap group consisting of three unweighted electrodes is used to provide a quadrature waveform for use by the phase detector.

FIG. 31 describes three different FIR filter variable delay elements with different sensitivities to the dynamic tap weights. FIG. 31 illustrates how the structure of the background taps 510, 514, 516, 518 and 526 affects the sensitivity of relative tap group delay to the weight A of the dynamic taps 512, 520, 522 and 524. In each case shown in FIG. 31, the dynamic tap weight A is controlled by a five bit binary word (one sign bit, 4 magnitude bits). A "delay increment" corresponds to a one least significant bit (LSB) change in the five bit amplitude A. These examples are based on transversal filter tap spacing of 5.6 nanoseconds. The results given are valid near 10.7 megahertz.

Figure 31A:
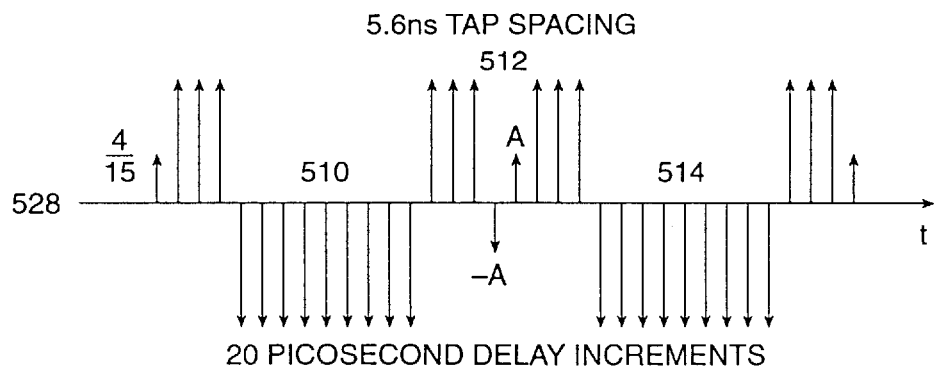
FIG. 31a, FIG. 31b, and FIG. 31c give examples of tap weight sets chosen to yield different sensitivities of delay to the control signal.
Figure 31B:
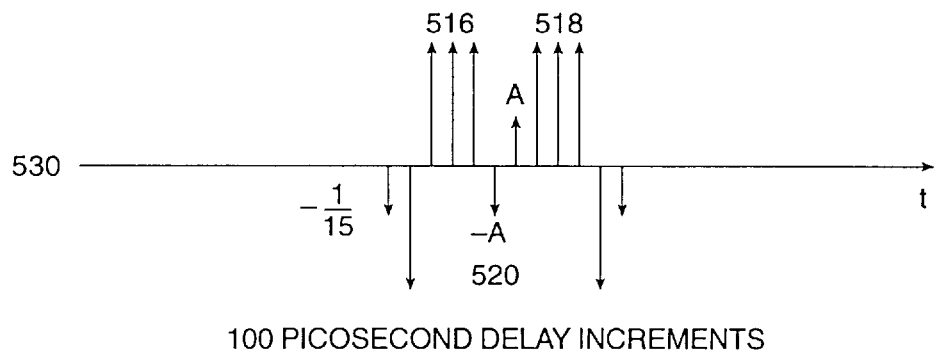
Figure 31C:
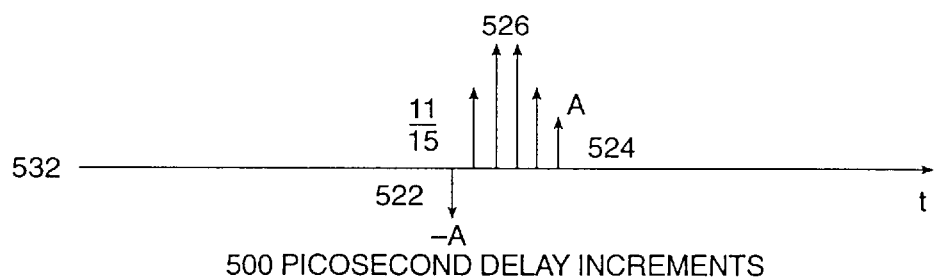

Referring to FIG. 31*a*, in the first case 528, a large number of taps 510 and 514 having static weights yields a large inertia of group delay. A one LSB change in the weight A of the dynamic taps 512 yields only a 20 picosecond change in the group delay of the delay element 528. Referring to FIG. 31*b*, in the second case 530, a smaller number of static taps 516 and 518 allows the dynamic taps 520 to exercise more significant control over the relative group delay of the delay element 530. In this case, one LSB of change in the weight A of the dynamic taps 520 yields a 100 picosecond change in the delay element group delay. Referring to FIG. 31*c*, in the last case 532, a relatively small number of static taps 526 and a wide spacing of the dynamic taps 522 and 524 yields a very wide variation in group delay for the delay element 532 with respect to the weight A of the dynamic taps 522 and 524. A one LSB change in A in case 532 yields a 500 picosecond increment in relative group delay for the tap group.

Figure 32:
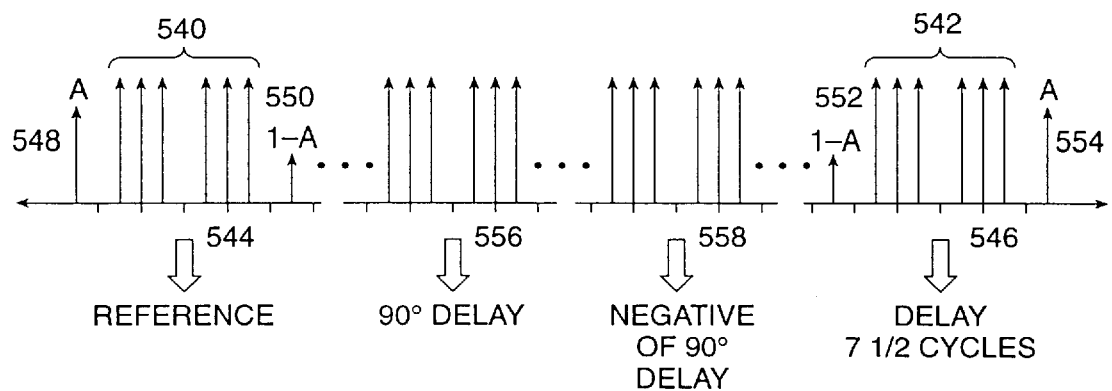
FIG. 32 illustrates a tap structure where symmetry is exploited so that tap groups track in cancellation magnitude as the cancellation frequency, through relative delay, tracks the interference frequency.

When a pair of dynamic taps are changed to adjust the relative delay of a tap group, the magnitude of that tap group also changes. This should be avoided because deep cancellation in a simple delay element notch filter requires that the amplitude of the delayed signal 444, 452 match very closely with the amplitude of the reference signal 442, 450. FIG. 32 illustrates a structure which compensates for these undesired magnitude variations. In FIG. 32, both the reference 540 and the delay 542 elements are implemented by transversal filter variable delay elements. The reference and delay variable delay groups 540 and 542 are mirror images and are controlled symmetrically. As A is raised, the reference group dynamic taps 548 and 550 cause the reference group to yield lower relative delay, while the delay group dynamic taps 552 and 554 cause the delay group to yield higher relative delay. The delay between the reference 540 and delay 542 groups increases, but the magnitudes of the groups 540 and 542 track each other. Similarly, as A is lowered, the delay between the reference 540 and delay 542 groups is lowered, but again the magnitude of the delay group 542 tracks the magnitude of the reference group 540. Cancellation depth at 448 is maintained because the magnitudes track. The tap groups 556 and 558 in FIG. 32 are used to generate signals whose interference components are roughly in quadrature with the interference components at the reference tap group 540 and at the delay tap group 542. These approximate quadrature signals are used in the phase detector of FIG. 35.

Figure 33A:
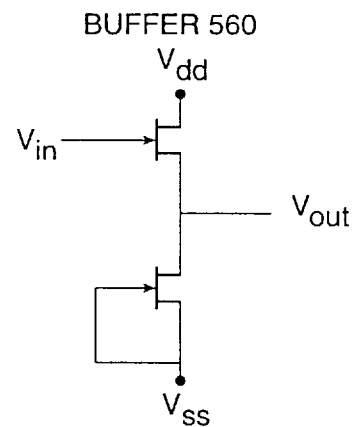
FIG. 33a and FIG. 33b illustrate circuits used in an integrated circuit (IC) canceler employing analog control of the taps of a notch filter canceler.
Figure 33B:
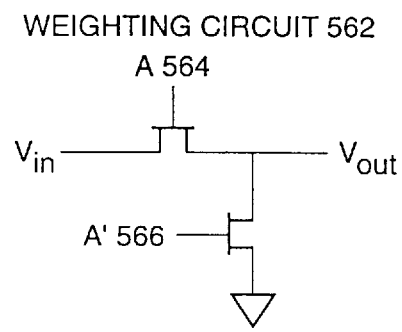

Circuits used to tap off a tapped delay line are shown in FIG. 33*a* and FIG. 33*b*. These circuits have been combined to implement the variable delay elements shown in FIG. 32 and used for setting the tap weights in FIG. 48. The buffer 560 corresponds to buffer circuits 1924 and 1926 and is used to tap off a delayed signal from an analog tapped delay line without loading down the delay line. The analog weighting circuit 562 is used to implement a variable tap weight A of taps 1902, 1908, and 1910, 1916 of FIG. 48. The analog weighting circuit 562 requires two complementary control voltages, A 564 and A' 566, to implement an attenuation proportional to A through a FET voltage divider. The weighting circuit 562 is typically followed by a buffer similar to the buffer 560, so that the tap weighting is insensitive to output loading. When this circuit is applied to the types of tap groups shown in FIGS. 32 and 30, tap group relative delay ΔT is very linear with control voltage A.

The circuits shown in FIG. 33*a* and FIG. 33*b* may be used to implement analog tap weighting on the dynamic taps in each tap group. The buffer 560 circuit shown is a source follower. The buffer is used to sense the voltage of a nondestructive sense (NDS) tap in the ACT channel whose position corresponds to the intended location of a dynamic tap. The NDS tap conveys a high impedance voltage signal in proportion to the proximate charge sensed in the ACT channel. The buffer circuit senses this voltage with a high impedance input ($V_{in}$) and supplies the weighting circuit 562 with that same voltage ($V_{out}$) but at a low impedance suitable for driving the weighting circuit.

The weighting circuit 562 is a resistive voltage divider whose resistive elements are field effect transistors. The control voltages A 564 and A' 566 control the effective resistance of the FETs in the voltage dividers. Depletion mode FETs are used which are compatible with the ACT fabrication process. The result is that the effective attenuation from $V_{in}$ to $V_{out}$ in the weighting circuit 562 may be varied linearly about 0.5 by varying A and A' linearly, in a complementary fashion, about −1.25 V with respect to ground as shown in the weighting circuit 562.

Operation of the weighting circuit 562 is sensitive to impedance loading at $V_{out}$. For this reason, the weighting circuit is followed by another source follower buffer 560 circuit. This last buffer circuit decouples the weighting circuit from its eventual load.

Successful design of a delay element tap group involves assuring sufficient group delay variation to accommodate sufficient range of control over notch frequency. The required one-sided group delay variation, $\Delta T$, is related to the one-sided peak frequency deviation by the following equation $$\frac{\Delta T}{T_c} = \frac{\Delta f}{f_c} \qquad (12)$$

where $f_c$ is the center operating frequency and $T_c$ is the nominal baseline delay. In the preferred embodiment, $f_c$=10.7 MHz, $T_c$=701 ns and $\Delta f$=100 kHz. $\Delta T$ is therefore greater than or equal to 7 ns to provide for group delay variation which will yield sufficient (100 kHz) notch frequency range.

It should be noted that the use of complementary tap groups, such as those shown in FIG. 32, reduces by a factor of 2 the required group delay variation range of each tap group. This is because the relative tap group group delay changes as the sum of the changes in the two individual tap group group delays. Therefore, in the preferred embodiment, since complementary tap groups are used, the required group delay variation per tap group is only 3.5 ns.

The maximum phase deviation, $\Delta \Phi$, required of each tap group may be approximated from the maximum group delay variation, $\Delta T$, required of each tap group, using the equation $$\Delta \Phi = 2\pi f_c \Delta T = 2\pi T_c \Delta f \qquad (13)$$

For the preferred embodiment, $\Delta \Phi$=0.24 Rad=14°.

The range of amplitude variation range of the dynamic taps with respect to the amplitudes of the static taps should be sufficient to accommodate a phase variation of $\Delta \Phi$. The phase variation for a given tap group structure of static and dynamic taps may be analyzed as follows.

The baseline magnitude of a tap group may be taken by analyzing the response of a tap group at center frequency. Suppose a tap group consists of N static taps of unit amplitude spaced at intervals $T_s$ surrounded by a pair of dynamic taps, one at each end. The baseline magnitude response at center frequency may be found by evaluating the Fourier transform of the tap group with the dynamic taps set to zero. The magnitude M of the resulting frequency response is $$M = N \frac{\sin(\pi N T_s f_c)}{\pi N T_s f_c} \qquad (14)$$

If the dynamic taps are set to zero, the phase response of the tap group is zero with respect to the center of the tap group. If the dynamic taps are set to values of ±A, then the dynamic taps add an odd symmetry component of of magnitude $M_{odd}$ which is $$M_{odd} = 2A \sin(\pi(N+1)f_c T_s) \qquad (15)$$

Sufficient phase deviation range is assured when A may be varied such that $$\Delta \Phi = \tan^{-1}\left(\frac{M_{odd}}{M}\right) \qquad (16)$$

In the preferred embodiment, $T_s$=16.67 ns, N=2, M=1.6 and $M_{odd}$32 0.4 for A=0.2. This means that a dynamic tap weight of A=0.2 will a phase offset of $\Delta \Phi$=14° which will adjust the notch frequency by 100 kHz in the preferred embodiment.

Figure 34:
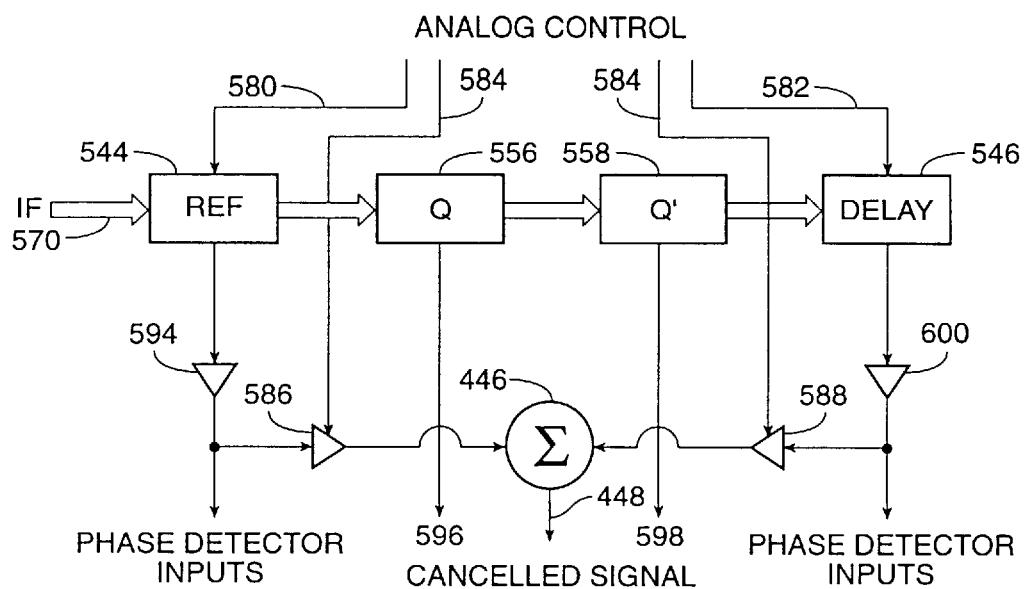
FIG. 34 is a block diagram of an IC canceler having FIR based adjustable delay groups, quadrature ($\approx 90°$) signal generation, cancellation through linear combination, gain adjustment for cancellation depth control, applied analog control signals, and outputs for feeding the phase detector.

A block diagram for a comprehensive variable delay element canceler circuit is shown in FIG. 34. This integrated canceler circuit accepts, as an input, an IF with an interference signal 570. Reference 544, quadratures 556, 558 and delay 546 tap groups are of the form illustrated in FIG. 32 as 544, 556, 558 and 546 All tap groups tap off the same tapped delay line. Any tapped delay line technology may be employed. Control is applied to the reference group through the left control line 580. Control is applied to the delay group through the right control line 582. The center control lines 584 control the gain adjustments 586 and 588 for the canceler summation circuit 446. The ability to directly control the attenuation 586 and 588 into the summer 446 allows for calibration of null depth at the output of the canceler 448. The cancelled signal 448 is an output of the integrated canceler circuit. The signal coming from the reference tap group 594, the quadrature tap groups 596 and 598, and the delay tap group 600 are outputs which are used as inputs to the phase detector.

Phase Detector

Figure 35:
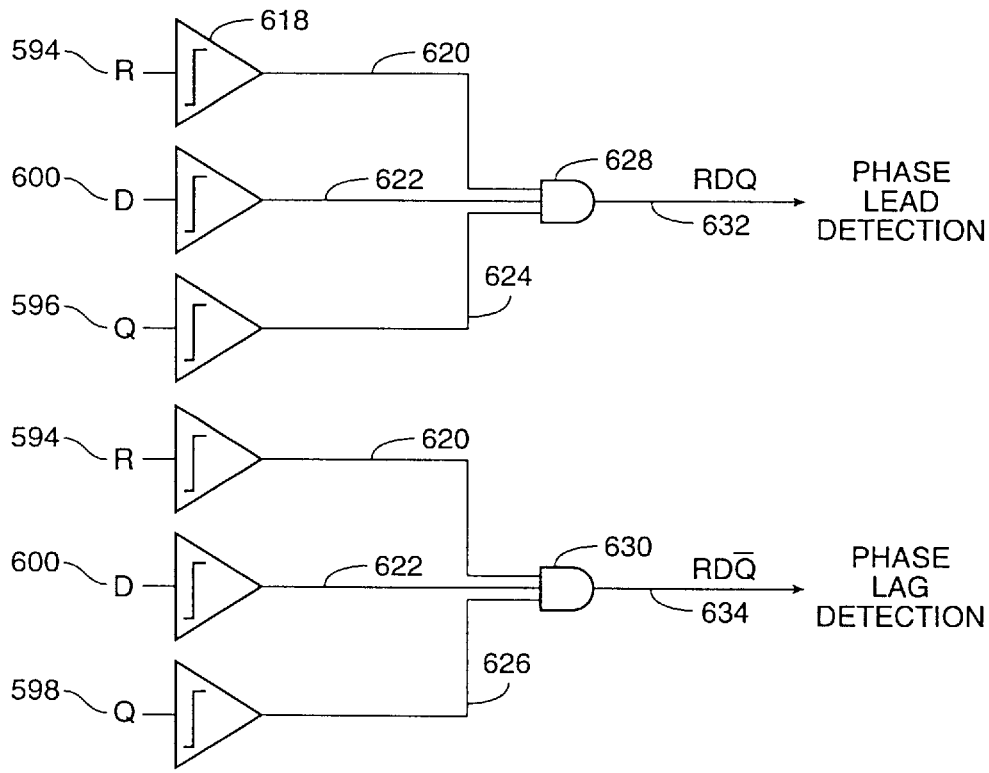
FIG. 35 is a block diagram of a phase detector designed for the tracking canceler of FIG. 34.

FIG. 35 shows the phase detector used in tracking the interference frequency. R 594, reference signal, is the signal taken from the reference leg of the integrated canceler circuit of FIG. 34. D 600, delayed reference, is the signal taken from the delay leg of the integrated canceler circuit. Q 596 and $\overline{Q}$ 598, approximate quadrature signals, are taken from the quadrature outputs 556 and 558 of the integrated canceler circuit.

The first function applied to the phase detector inputs is zero crossing detection (one bit D/A conversion) at the zero crossing detector 618. The predominant interfering signal is expected to dominate the locations of the zero crossings. The outputs 620, 622, 624 and 626 of the zero crossing detector are square wave estimates of the predominant interfering component. These square wave estimates are referred to by the same names R, D, Q and $\overline{Q}$ as their corresponding zero crossing detector inputs 594, 600, 596 and 598.

The two level digital (square wave) estimates of the interference signal are applied to two AND gates. The first AND gate is the phase lead detection gate 628, and its output is denoted RDQ 632. The second is the phase lag detection gate 630, and its output is denoted RD$\overline{Q}$ 634. The operation of these gates is illustrated in FIG. 36.

Figure 36A:
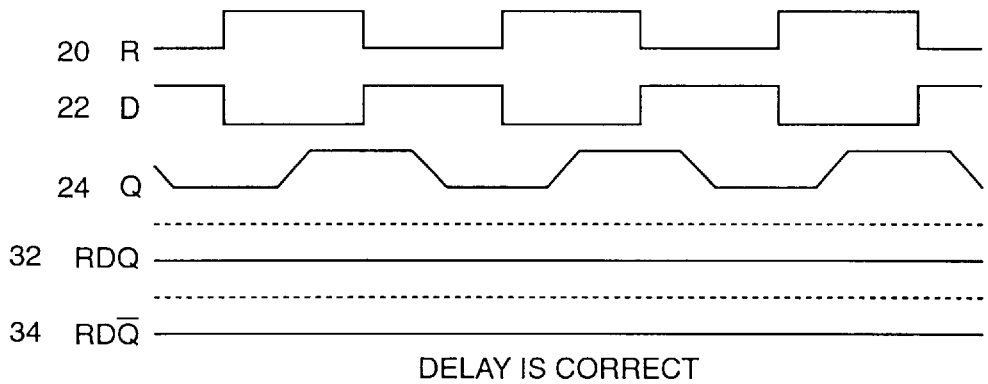
FIG 36a, FIG. 36b, and FIG. 36c illustrate timing diagrams explaining operation of the phase detector of FIG. 35.

FIG. 36a shows the desired condition of D 622 equal to the inverse of R 620. This condition yields maximum cancellation of the interference signal at the canceler output 448. In this case, the phase lead detection signal RDQ 632 and the phase lag detection signal RD$\overline{Q}$ 634 are both equal to zero at all times.

Figure 36B:
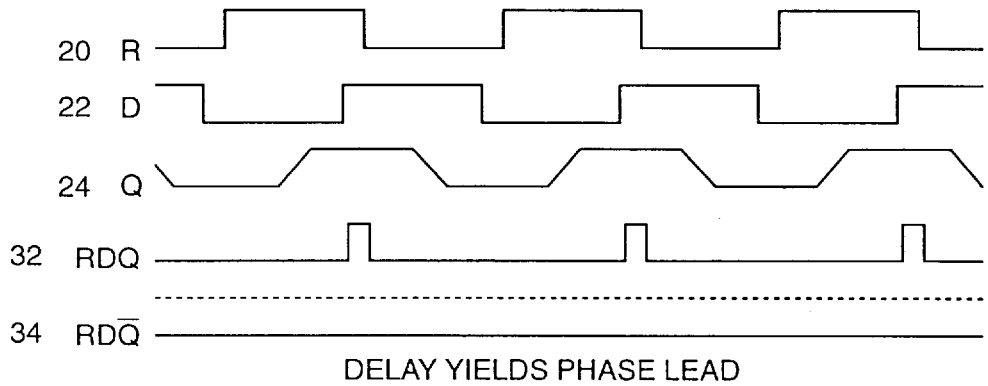

FIG. 36b shows D 622 leading R 620 in phase. This case indicates that the notch frequency $f_z$ 470 is higher than the frequency of the interference signal. The delay between the reference group and the delay group is too short for optimal cancellation. This condition is indicated by the presence of a pulse on the RDQ line 632 and the absence of a pulse on the RD$\overline{Q}$ line 634. The necessary correction to the control voltage A 548, 554, 564 is proportional to the width of the pulse on the RDQ line 632.

Figure 36C:
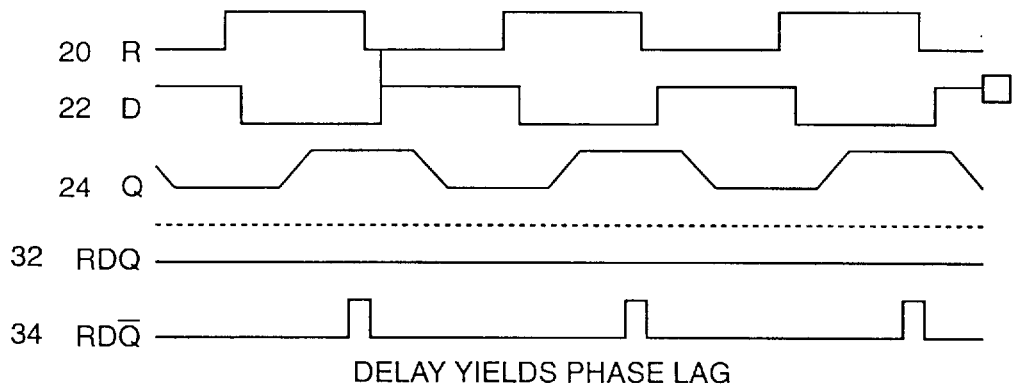

FIG. 36c shows D 622 lagging R 620 in phase. This case indicates that the notch frequency $f_z$ 470 is lower than the frequency of the interference signal. The delay between the reference group and the delay group is too long for optimal cancellation. This condition is indicated by the presence of a pulse on the $\overline{\text{RDQ}}$ line 634 and the absence of a pulse on the RDQ line 632. The necessary correction to the control voltage A 548, 554, 564 is proportional to the width of the pulse on the $\overline{\text{RDQ}}$ line 634.

Figure 37:
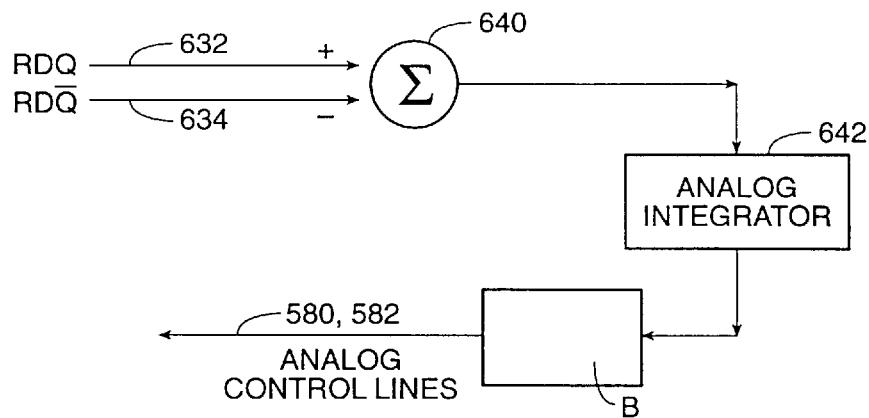
FIG. 37 illustrates how the outputs of the FIG. 35 phase detector may be used to generate analog control signals for the adjustable delay elements.

FIG. 37 shows how the control line signals 548, 554, 564, 580 and 582 are derived from the phase detector output signals RDQ 632 and $\overline{\text{RDQ}}$ 634. The phase lead and phase lag signals RDQ 632 and $\overline{\text{RDQ}}$ 634 are subtracted in a summer 640 and then integrated in an analog integrator 642. The outputs of integrator 642 are added in an operational amplifier circuits B so that the outputs 580 and 582 therefrom may generate the control voltages for tap weights A and A'. Amplifier B operates so that A=−1.25V+B and A'=−1.25V−B, where B equals the output from integrator 642. The results 580, 582 are used to generate the analog control voltages A 548, 554 and 1-A 550, 552. These voltages in turn affect the delay T 440 between the reference 544 and delay 546 tap groups to close the feedback loop on tracking cancellation.

Closed Loop Canceler

Figure 38:
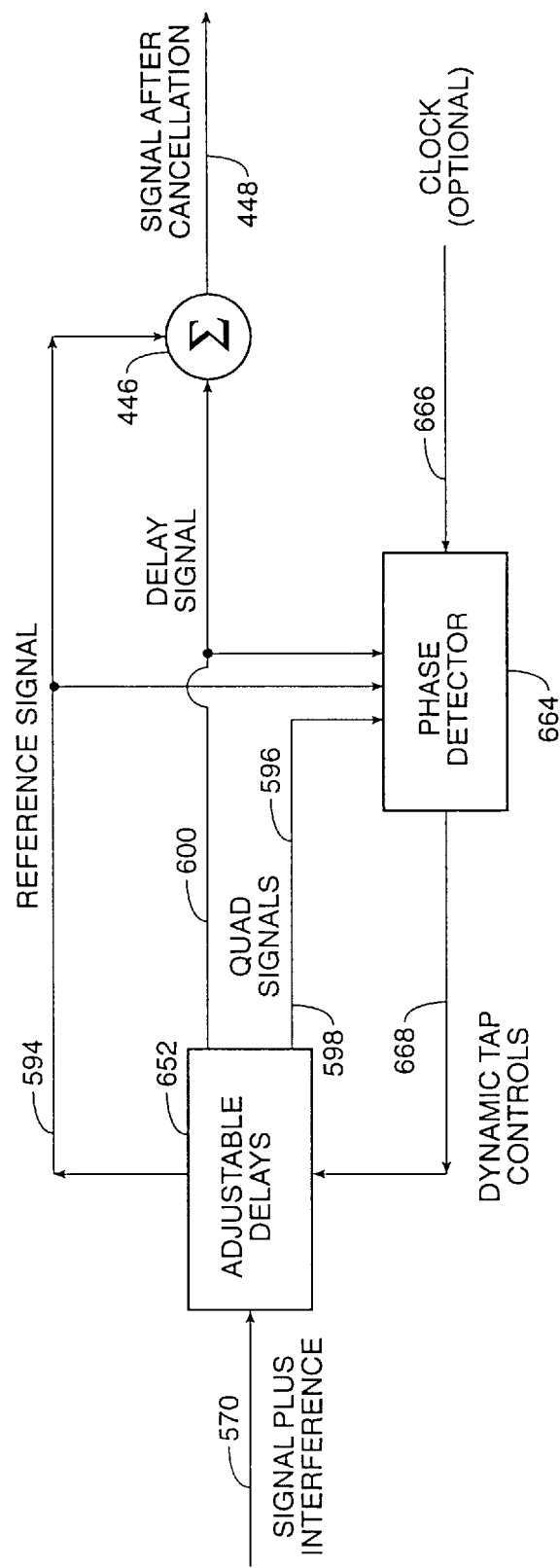
FIG. 38 is a block diagram for a closed loop tracking delay element canceler.

FIG. 38 is a block diagram of a closed loop tracking delay element notch filter. The input 570 is the signal of interest plus one predominant interfering signal. The adjustable delays, implemented using tapped delay line 652, are the reference elements 594, 544 and the delay elements 600, 546. The delay generator 652 also implements stationary quadrature delay elements 596, 598, 556, and, 558. The reference 594, 544 and the delay elements 600, 546 are summed at the summer 446 to yield the output signal 448 with interference cancelled.

The phase detector and control signal generation circuitry shown in FIGS. 35 and 37 are implemented in phase detector 664. Its output 668 dynamically controls the adjustable delay line 652. Output 668 also serves as an estimator of the interference frequency and may be used to generate a demodulated FM output. The clock 666 is not essential, but is used in a digital implementation to be discussed later. The FIG. 38 tracking canceler may be implemented using either digital or analog delay control.

Figure 39:
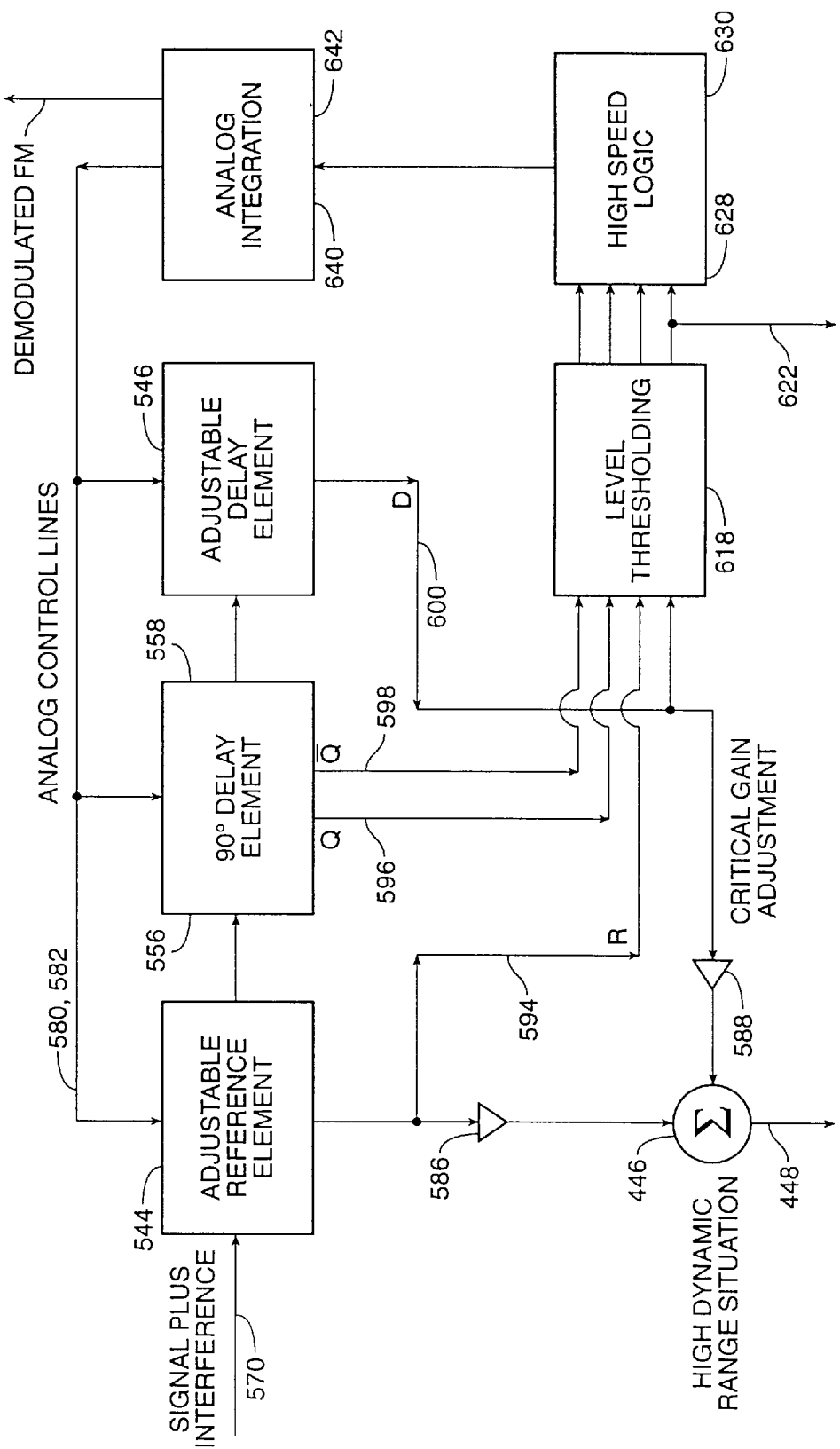
FIG. 39 is a block diagram of a closed loop tracking canceler employing analog control signals for adjusting the variable delay elements.

A tracking canceler loop employing analog delay control is illustrated in FIG. 39. The reference 544 and delay element 546 wave forms are summed at 446 to yield a cancelled interference output 448. Gain adjustment elements 586 and 588 ensure deep cancellation, as shown in FIG. 34. The signals R 594, Q 596, $\overline{\text{Q}}$ 598 and D 600 are applied to level thresholding circuitry 618 which is followed by high speed logic 628, 630. Elements 618, 628, 630 represent the phase detector of FIG. 35. High speed logic 628, 630 is followed by the analog integration function 640, 642 which is shown in FIG. 37. This yields analog control signals 580, 582 which control the adjustable delay elements, and a demodulated FM signal in the case where FM demodulation is useful.

Figure 40:
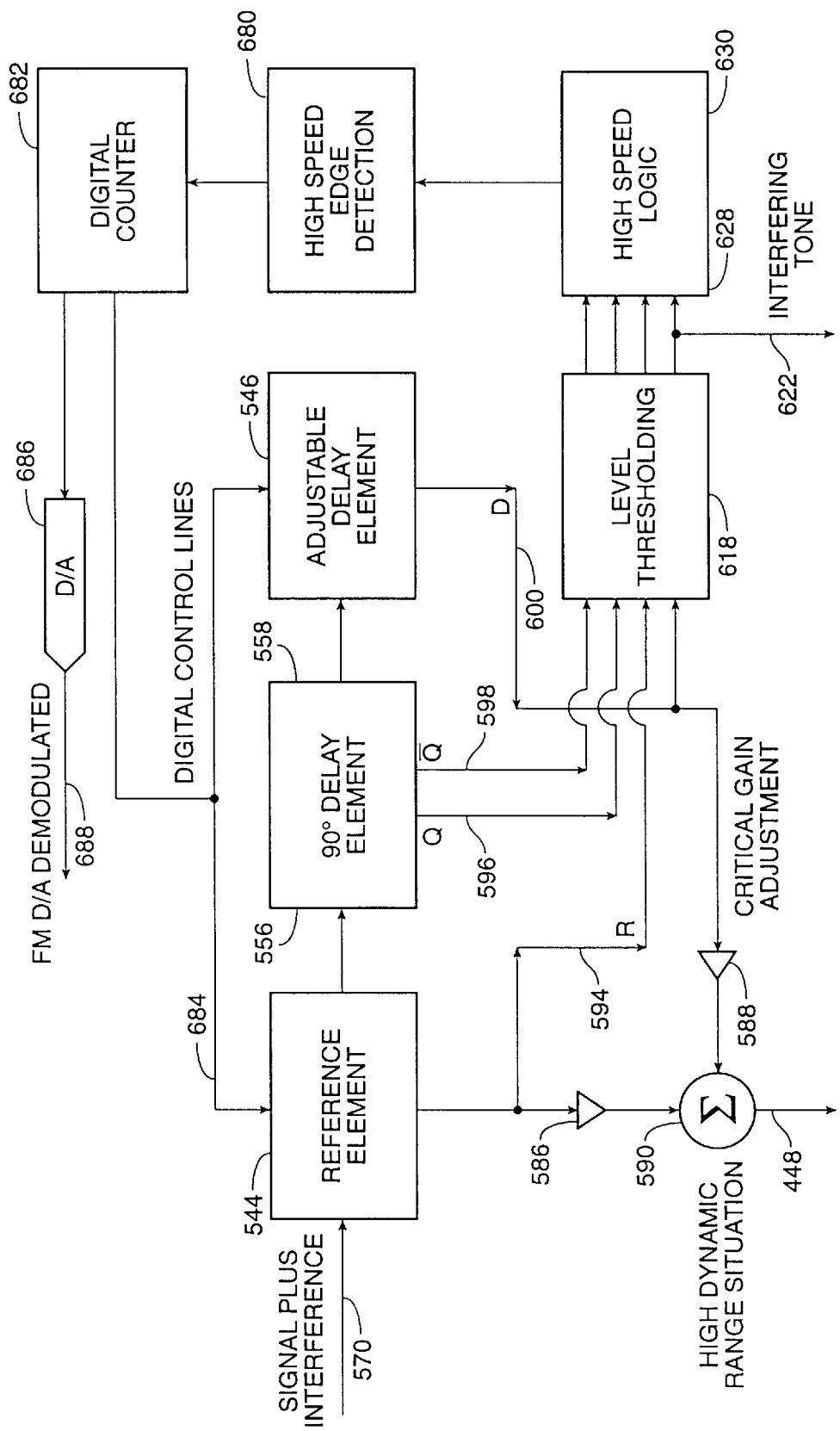
FIG. 40 is a block diagram of a closed loop tracking canceler employing digital control signals for adjusting the variable delay elements.

A tracking canceler loop employing digital control is illustrated in FIG. 40. The FIG. 40 canceler is essentially the same as the FIG. 39 canceler. The main difference is that the analog integration elements 640, 642 of FIG. 39 are replaced by an edge detector 680 and a digital up-down counter 682. These are used to count phase detector pulses 632, 634 as a means for integrating numerically. The output of the digital counter is interfaced to a set of digital control lines 684 which are used to digitally set the weights of the dynamic taps 548, 550, 552 and 554 in the reference 544 and delay 546 elements. The digital count in 682 may also be passed through a digital to analog (D/A) converter 686 to yield an estimate of the interference frequency 688.

The notch filter of FIG. 26 may be modified so that one input to the summer 442 is negative and the other positive. The wideband frequency response would be defined using $$|H_i(f)|=|\sin(\pi fT)| \tag{17}$$

The zeroes would be defined using $$f_z = \frac{n}{T} \tag{18}$$

And the narrowband model would reflect these new cancellation frequencies.

Another variation on delay element cancellation is the case where one of the legs 442 or 444 into the summer 446 includes a bandpass filter for coarse isolation of the interference signal. In this case, bandwidths of operation in excess of 1/T are possible.

Plural tracking cancellers may be cascaded for increased cancellation depth. It is likely that the cancellation frequency of the cancellers would be established by a single phase detector at the first canceller.

Another variation may be realized through a compound approach involving cancellation through the weighted summation of combinations of static and adjustable tap groups.

The fundamental building block of a delay element canceller is a delay element 440. More precisely, any tapped delay line 490 may be used to implement the delay elements 544, 556, 558 and 546 needed for a tracking delay element canceller. An acoustic charge transport tapped delay line is preferred. Tapped delay line implementations which could be adapted include: digital signal processing components (DSP's); bucket brigade devices (BBD's); charge coupled devices (CCD's); sets of A/D converters followed by banks of shift registers and D/A converters (A/D, digital delays, D/A); delta-sigma modulators followed by a long shift register and banks of summers (A/D, digital delay, D/A); and, transmission (L-C or R-C delay) lines.

Additionally, a reactive component delay element may be used to adjust delay monotonically with a control signal. The adjustable reactive delay element may be used in a canceller by itself, in cascade with a delay line of constant delay, in cascade with one or more reactive delay elements of constant or variable delay, or in cascade with a delay line element whose delay is also adjustable. Furthermore, adjustable reactive delay elements could be used in one leg 442, 444 of the canceller going to the summer 446, while an adjustable delay line delay could be used in the other. Still another variation is to combine bandpass filtering, mentioned as a vehicle for coarse interference isolation, with these approaches. It is conceivable that the reactive element used to adjust delay could be one or more of the components of the same coarse bandpass filter or filters.

FIG. 31 illustrates three variations of adjustable delay tap groups whose dynamic taps are of opposite sign (FIG. 30c). These three variations are intended as examples. The same methodology may be applied to any number of tap groups in either the opposite sign dynamic taps case (FIG. 30c) or in the complimentary positive (or negative) dynamic taps case (FIG. 30b).

Figure 41A:
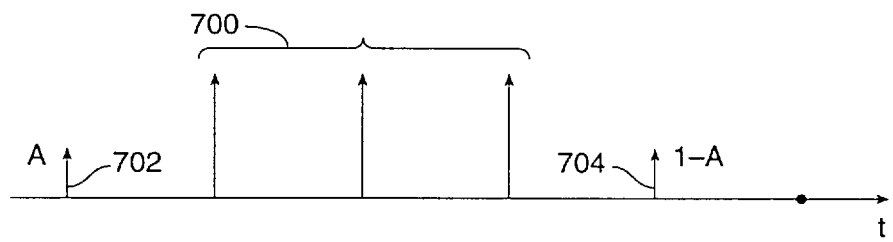
FIG. 41a FIG. 41b, and 41c illustrate tap weight sets which implement walking delay element tap groups.
Figure 41B:
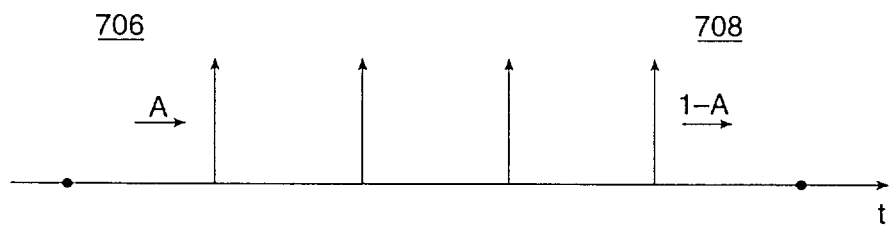
Figure 41C:
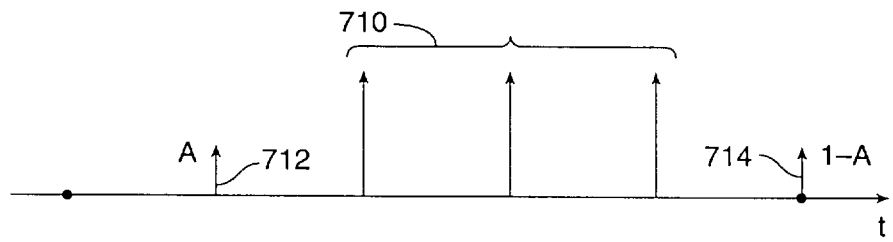

Another delay element tap group is illustrated in FIG. 41. In this tap group, the elements achieve a wider range of delay adjustment by "walking" along the tapped delay line. A pair of dynamic taps 702, 704 in FIG. 41(a) are adjusted until they reach their adjustment threshold, while taps 700 are static. At this point, the dynamic taps "walk" over 706, 708 in FIG. 41(*b*) to a new position where they resume adjusting the delay 712, 714 in FIG. 41(*c*). In that case, taps 710 are static. This type of tap walking or transition may occur more than once and may occur in either direction. This walking delay element tap group also lends itself to symmetric reference and delay structures such as that shown in FIG. 32.

In FIG. 32, either the reference group 544 or the delay group 546 could be replaced by a stationary tap group. In this way, system simplicity is gained at the expense of cancellation depth. Furthermore, the 90° (556) and −90° (558) delay groups could come from a single tap and an inverting amplifier circuit, or the ±90° signals could be generated using reactive elements. The precise phase of these circuits is not critical to the operation of the phase detector described.

The tap weight structures mentioned for controlling dynamic tap weights include an analog FET voltage divider structure (FIG. 33*a*) or a digital control structure inherent to the ACT PTF (FIG. 33*b*). Any tap weight implementation which would control the tap weight in real time could be a suitable approach.

The phase detector of FIG. 35 provides a convenient indicator of the offset between the instantaneous loop cancellation frequency and the interference frequency. However, the use of this specific phase detector is not absolutely necessary. An alternative would be to use either a 180° or a 0° phase phase/frequency comparator, such as the GigaBit Logic 16G044/16G044M. An advantage of such a phase/frequency detector is that the Q 596 and $\overline{Q}$ 598 outputs are not needed for the phase detector.

Cancellation may be configured such that a master canceller receives a signal from an antenna pointed to the interference, while a second slave canceller receives its input from a second antenna pointed to the source of interest. The master canceller has a high interference to signal ratio which makes it easier for it to lock onto the interference frequency, while the slave canceller, which may not have enough interference to lock onto, yields the more desireable processing gain of the canceller compounded with processing gain due to directivity.

For FM demodulation applications, demodulation quality is superior to PLL demodulation in environments with significant multipath. This is because the canceller tracks frequency rather than phase. The canceller is therefore insensitive to abrupt phase transitions which would cause a PLL to lose lock.

When the dynamic tap weight A 548, 554 is used to demodulate an FM input signal, the demodulation linearity calculation is straightforward and compensation for nonlinearity is also straightforward. Suppose, however, the FIG. 33 tap weight circuits were employed, and the FET gate voltage A 564 were used as the demodulation output. In this case, the divider network and the components themselves compound the demodulation nonlinearities. Linearization circuits are still practical in this case. Linearization of the direct demodulated signal represents an important variation of this invention for FM demodulation applications.

Nonlinearities and compensation for the simple case of demodulation through direct tap weight A 548, 554 is now considered as an example. Suppose the R 544 and D 546 tap groups were separated in relative group delay by T 440 to yield a given cancellation frequency f where.

$$T = T_c + \Delta T \quad (19)$$

and $$f = f_c + \Delta f \quad (20)$$

$T_c$ represents the nominal delay when A takes on its nominal average value (½ in 500 or 0 in 506) which corresponds to the center cancellation frequency $f_c$. $\Delta f$ and $\Delta T$ represent relative cancellation frequencies and delays.

$$f_z = \frac{n + 1/2}{T}$$

may be rewritten $$f = \frac{N}{T} = f_c + \Delta f = \frac{N}{T_c + \Delta T} \quad (22)$$

or $$f = \frac{N}{T} = f_c + \Delta f = \frac{N}{T_c + \Delta T} \quad (23)$$

$$N = fT = (f_c + \Delta f)(T_c + \Delta T) \quad (24)$$

The variable N represents n+½ when the canceller summation 446 operates on R 544 and D 546 with the same sign. The variable N represents n when the canceller summation 446 operates on R 544 and D 546 with opposite sign. For a given applied FM signal with instantaneous relative frequency $\Delta f$, the phase $\Phi(\Delta f)$ relative to the center of a variable tap group is denoted $$\Phi(\Delta f) = \frac{2\pi}{N_{var}} f\Delta T = \frac{2\pi}{N_{var}} (f_c + \Delta f)\Delta T \quad (25)$$

$N_{var}$ is an index where $N_{var}=2$ if 2 variable delay groups are combined in a complementary delay structure (FIG. 32) and $N_{var}=1$ if only one tap group implements a variable delay. Since $\Delta T$ may be rewritten $$\Delta T = \frac{N}{f_c + \Delta f} - T_c \quad (26)$$

$\Phi(\Delta f)$ may also be rewritten $$\begin{aligned}
\Phi(\Delta f) &= \frac{2\pi}{N_{var}} (f_c + \Delta f)\left(\frac{N}{f_c + \Delta f} - T_c\right) \\
&= \frac{2\pi}{N_{var}} (N - T_c f_c - T_c \Delta f) \\
&= -\frac{2\pi}{N_{var}} T_c \Delta f
\end{aligned} \quad (27)$$

The phase relative to the center of a variable tap group is also the arc tangent of the ratios of the odd and even components of the time response of a tap group. The even component of a tap group's time response is determined by the static taps 498, 504 and the average values of the dynamic taps 500, 502, 506 and 508. This component may be denoted $M_{even}$. $M_{even}$ is constant for a given tap group. The odd component of a tap group's time response is determined by the dynamic taps and may be denoted $M_{odd}$. $M_{odd}$ is a linear function of A 548, 554 and may therefore be used to characterize nonlinearities of A with $\Delta f$. The mathematical result is that $$\Phi(\Delta f) = \tan^{-1}\left(\frac{M_{odd}}{M_{even}}\right) \quad (28)$$

Equating $\Phi(\Delta f)$ in Eqns. 17 and 18 yields $$M_{odd}(\Delta f) = M_{even}\tan\left(\frac{2\pi}{N_{var}} T_c \Delta f\right) \quad (29)$$

which describes the nonlinearity of A ($M_{odd}(\Delta f)$) with respect to $\Delta f$. Eqn. 24 characterizes nonlinearities due to FM demodulation. As an example, suppose a sinusoid was used to frequency modulate a 10.7 MHz carrier ($f_c$=10.7 MHz) with a maximum frequency deviation of 85 kHz. Suppose also that the tracking canceller demodulated incorporated a nominal delay of 701 ns ($T_c$=7.5/$f_c$=701 ns) in a complementary variable tap configuration ($N_{var}$=2). In this case, Eqn. 24 predicts a total harmonic distortion of 0.23%.

A simple linearization algorithm to improve this would be to apply hyperbolic tangent compression. Bipolar transistor differential pair circuits have hyperbolic tangent gain characteristics. The compensation nonlinearity is modeled mathematically using $$M_{comp}(\Delta f) = M_{even}\tanh\left(\frac{M_{odd}(\Delta f)}{M_{even}}\right) \quad (30)$$

where $M_{comp}(\Delta f)$ represents the compensated demodulation waveform. Applying the same example, total harmonic distortion is reduced from 0.23% to 0.0016%. This represents a very significant improvement in FM demodulation linearity through a very simple linearization circuit.

Figure 42:
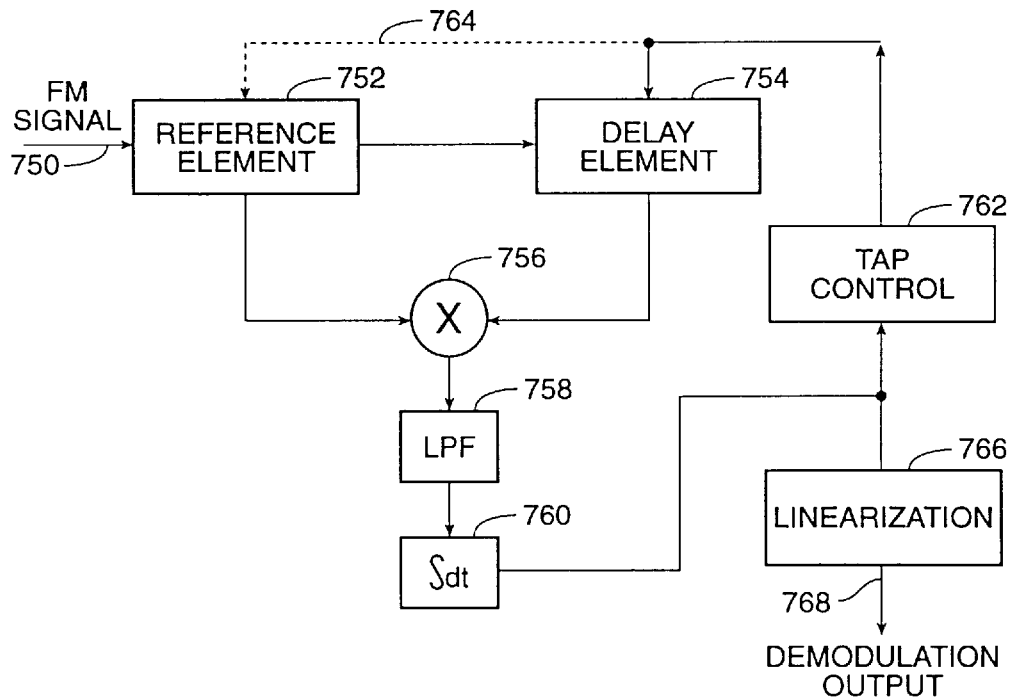
FIG. 42 illustrates an FM demodulator, based on variable delay elements, which is insensitive to spurious FM waveform phase variations such as due to multipath.

The tracking delay element interference canceller and FM demodulator may be modified to make a simple FM demodulator. An example of this modification is shown in FIG. 42. The incoming FM signal 750 is passed through a delay network, containing a reference element 752 and a delay element 754. In this simple case, the relative delay between the reference 752 and delay 754 elements tracks the instantaneous FM signal 750 by maintaining a 90° phase relationship between the two timing elements 752 and 754. Control of the variable group delay elements is through the control line 764. FIG. 42 shows that the delay element 754 is variable, while the reference element 752 may not be. In practice, either or both may be made variable.

Instantaneous phase relative to the 90° baseline reference is measured through a mixer 756 and a lowpass filter 758. The integrator 760 accumulates the error signals generated by the phase detector 756, 758 and passes the result to the tap control block 762 which generates the proper control signals to close the feedback loop. The optional linearization section 766 may be used to compensate for nonlinearities in the tap control or in any aspect of the loop. The final demodulated FM output 768 is the result.

In cases where the interferer becomes temporarily weak, undesired spurious signals may dominate the phase detector RDQ 632 and $\overline{RDQ}$ 634 lines. When passed through the integrator 642 or counter 682 of FIGS. 39 and 40, respectively, the result is an error in the control signals 580, 582 of the delay elements 544, 546, 754. The remedy is to sense the level of the interference at the input. When the interference signal 570 power is sufficient to drive the phase detector 664, the integrator 642 or counter 682 is enabled. When the interference signal 570 power is insufficient to drive the phase detector 664, the integrator 642 or counter 682 is disabled. When the integrator 642 or counter 682 is disabled, the control lines 580, 582 of FIG. 37 remain at their last known states until interference power is sufficient to enable proper phase detector operation. This variation improves tracking performance for FM demodulation applications as well as interference cancellation applications.

Adjustable delay line element cancellation offers the advantage of fast response to delay control over systems using adjustable reactive element cancellation because reactive elements ring. This adjustment is faster than systems which use numerical interference frequency estimation techniques, because the frequency tracking is relatively trivial compared to conventional interference frequency estimation methods. The simple phase detection method works because the same signals that cancel each other are used to track each other. Quick control makes this canceller suitable for fast tracking of the optimal cancellation frequency. Another advantage of the delay element canceller over a reactive element notch filter is that when tracking quickly, the positive and negative phases of the skirts in the cancellation frequency response causes residual high frequency BPSK conversion on the interference signal which yields a higher effective cancellation depth. A third advantage of the delay element canceller is that the gradual skirts of the canceller frequency response make it slightly less sensitive to small errors in cancellation frequency than a reactive notch canceller with steeper skirts.

The delay element canceller has linear skirts, rather than the arbitrarily steep skirts of a reactive element canceller. This could cause unwanted distortion in the desired signal. Another cause of undesired distortion is the opposing phase characteristic of the canceller frequency response. Opposing phases on either side of the cancellation frequency helps cancellation but could hurt the desired signal. Solutions which correct the opposing phases of opposing canceller frequency response include the cascaded canceller and compound canceller approaches mentioned above. Unfortunately, these solutions also degrade the slopes of these same skirts.

In terms of the preferred phase detection method (FIGS. 35–37) the advantages include implementation simplicity, simple direct control of phase detector sensitivity through loop dynamics, the ability to detect new relative phase information every carrier cycle and the availability of simple enable and disable control. A disadvantage of the phase detector is that it: requires an approximate quadrature (~90°) waveform, and that its operating range is limited by the tracking accuracy of this 90° offset.

In terms of FM demodulation, one advantage over PLL's is that loss of lock due to phase reversals is avoided. Loss of lock yields a severe undesired transient in a PLL demodulation waveform, while it only yields a mild temporary error in the DLL demodulator described. Another advantage over conventional PLL demodulation of FM is that a VCO is not required. A disadvantage is that a delay element is required. Another disadvantage to PLL's is noise performance. Tracking a signal with itself through a delay yields better resistance to artificial phase transitions (multipath). Tracking a signal with a VCO alleviates a noise source (the delayed input signal). This is interpreted to mean that multipath resistance is bought at the expense of signal to noise ratio in clear channels.

A simple variable delay line approach yields an easily frequency adjustable signal canceller. Simple control of delay line canceller allows direct linear control of cancellation frequency. The inherent absence of resonant elements allows for fast adjustment of the frequency of cancellation. A single pair of gates serves as a phase detector for a fast, easy and simple way to track a single predominant interferer. The resulting closed loop system is a self adjusting, fast tracking interference signal canceller.

In this fast tracking loop, the loop delay is locked in delay to the corresponding frequency of the predominant input signal. Precise tracking of the frequency of the predominant input signal allows frequency tracking and FM demodulation. When very linear FM demodulation is required, linearization circuits may easily be used to improve demodulation linearity.

The delay line structure is inherently simple. The cancellation process has a very short time impulse response length. The canceller's response to the control signal is very fast because of the absence of resonant elements in the canceller. The canceller may be disabled very easily by turning off one of the inputs to the signal combiner.

The phase detector allows for fast tracking of the relative phase of interfering signals within the operating range. The sensitivity of the tracking canceller to the input is easily adjusted in the phase detector by adjusting the sensitivity of the zero crossing detectors 618. The sensitivity of the canceller may also be easily adjusted through the feedback network which controls the tap weights. The signals which determine the cancellation phase at the signal combiner 446 are the same signals that are used to update the cancellation phase at the signal combiner. This assures cancellation tracking. The lack of resonant elements in the control of this update (i.e. the delay, which controls cancellation frequency) enables true cancellation frequency readjustment on a cycle by cycle basis of the interfering signal.

This is not a frequency domain canceller nor a time domain canceller, but a variable notch whose instantaneous null frequency is automatically adjusted in real time. The multipath resistant nature of resulting FM demodulation is due to an adjustable delay which tracks instantaneous frequency rather than an adjustable oscillator which tracks the secondary variable, instantaneous phase.

The primary effects of multipath in an IBOC DAB system and the techniques used to mitigate these effects are summarized in Table 1. Inter-symbol interference is caused by strong echoes with long delay times; most experimental evidence suggests that delay spreads of 1 to 5 microseconds are common, although some measurements indicate that delays of 15 or even 30 microseconds may occur under some circumstances. As described above, one common technique used to combat this effect is frequency-domain multiplexing (FDM), in which a high data-rate signal is divided into a number of lower data-rate signals which are then transmitted in lower-bandwidth subchannels. The symbol time in each subchannel is made longer than the longest expected delay; this suggests subchannel data rates of less than 33 kHz (1/30 microsec) for the conditions described above.

FDM has the effect of confining the impact of long-delay multipath to a small number of subchannels; combining FDM with frequency sliding and forward error correction provides significant system robustness against multipath. The primary benefit of

TABLE I

| Multipath | Mitigation Technique |
| --- | --- |
| Inter-symbol interference (caused by strong echoes with long delays) | Frequency-Domain MUXing Frequency Sliding Forward error correction Channel equalization |
| Amplitude fading (bandwidth inversely proportional to delay spread) | Frequency Diversity Subchannel spreading Frequency sliding Coding and interleaving | frequency sliding in this regard is to minimize the effect of multipath on any one channel by moving the subchannels through the affected frequency range. Forward error correction may then be applied to restore the data lost in the affected subchannels. Additional protection against inter-symbol interference is provided by the channel equalization techniques described above.

These techniques offer some amount of protection against the amplitude fading effects of multipath, although the amount of protection depends on the characteristics of the fading. In particular, the coherence bandwidth of the fading is a critical factor in determining the effectiveness of these mitigation techniques. Experiments have suggested that typical rural and urban multipath will cause fading with coherence bandwidths of $B=30/D$ to $60/D$ where B is the 90% coherence bandwidth in kHz and D is the delay spread in microseconds. For delay spreads of more than 1 microsecond, this gives coherence bandwidths of less than 30 kHz. In these cases, amplitude fading will affect only a small number of subchannels, and the frequency diversity techniques described above will be effective.

For cases with very small delay spreads (and correspondingly large coherence bandwidths), multipath mitigation through data coding, interleaving, and error correction are required. For mobile receivers, the spatial correlation of amplitude fading and the velocity of the platform are important, since these will determine the amount of time the receiving antenna spends in the fading region. Measurements indicate that spatial correlation distances from 7 inches to 2 feet are common; theoretical analysis predicts correlation distances of up to 7 feet. For a vehicle travelling at 20 miles per hour, these multipath correlation distances would require data coding and correction which can handle reduced-quality data for periods of tens to hundreds of milliseconds. This is within the capabilities of recently developed burst-error detection and correction techniques.

FM TO AM CONVERSION CANCELER

In-band on-channel FM DAB requires demodulation of a low power digital signaling waveform in the presence of a high power FM signaling waveform. A delay locked loop FM canceler has been proposed; however, multipath has the effect of causing conversion from FM to AM. The resulting undesired AM signal interferes with the DAB but is not completely extracted with a delay locked loop canceler or other known or proposed cancellation techniques.

The FM to AM conversion canceler functions upon the principle that the amplitude of the FM to AM conversion interference component is corrected to the instantaneous frequency of the FM signal as a function of the channel multipath. The FM to AM conversion canceler estimates this correction and continuously updates this estimate. While continuously updating this correlation estimate, it uses the instantaneous frequency and the correlation estimate to estimate the FM to AM interference term for cancellation.

Figure 45:
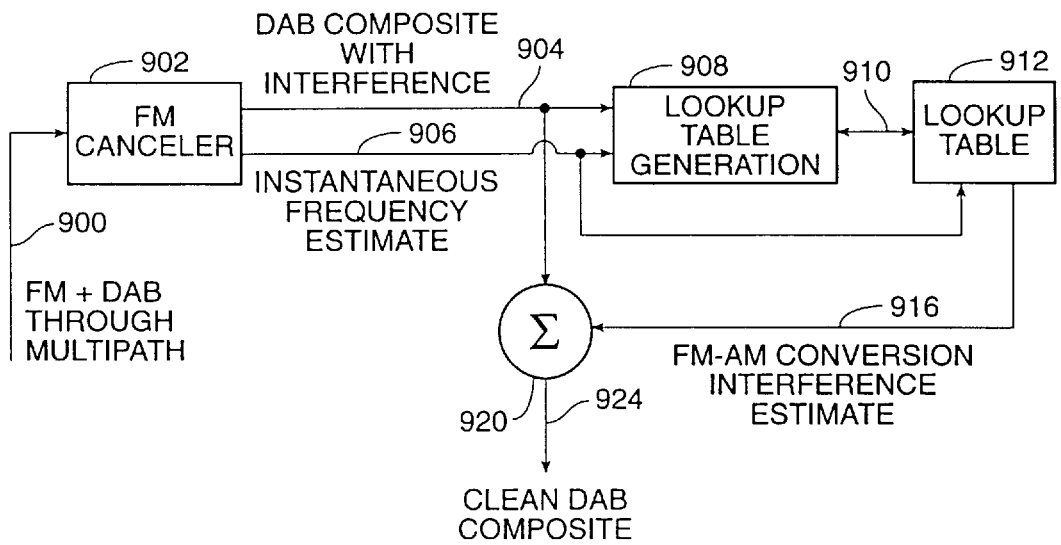
FIG. 45 is a schematic diagram of an interference canceler.

A lookup table embodiment is shown in FIG. 45. The FM canceler 902 receives FM DAB signal 900 and provides a baseband canceled signal (DAB minus FM) amplitude as well as instantaneous frequency information to "lookup table generation" hardware 908 used to generate a "lookup table" 912—a running estimate of the FM to AM conversion interference to be expected from a given instantaneous FM frequency. The lookup table receives the instantaneous frequency and returns the most recent estimate 916 of the FM to AM interference level to be expected at that frequency. This FM to AM interference estimate is subtracted from the DAB composite to yield a clean DAB composite 924, free of most of its FM to AM interference.

Figure 46:
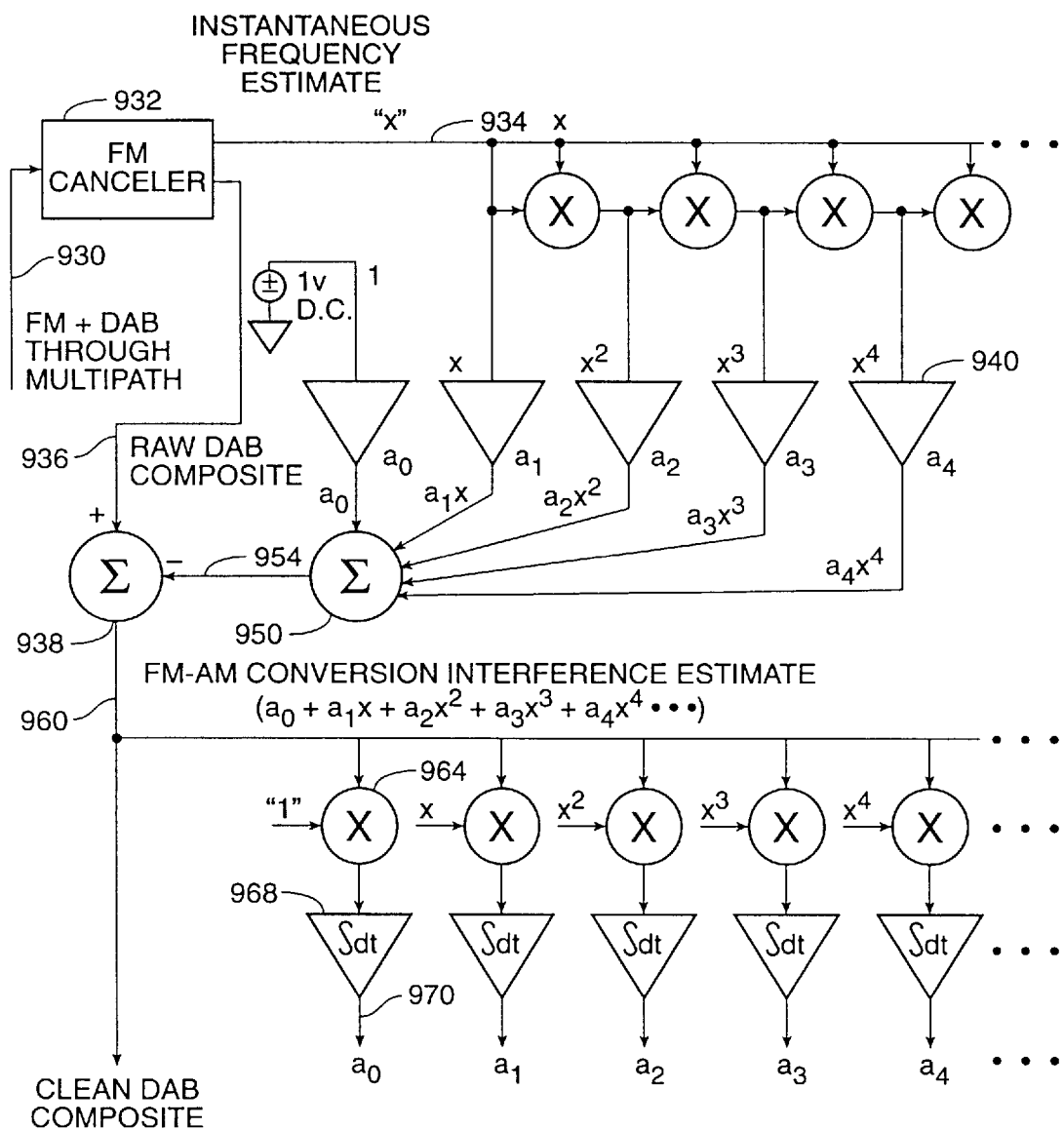
FIG. 46 is a schematic diagram of a polynomial estimator embodiment of an FM to AM interference canceler.
Figure 47:
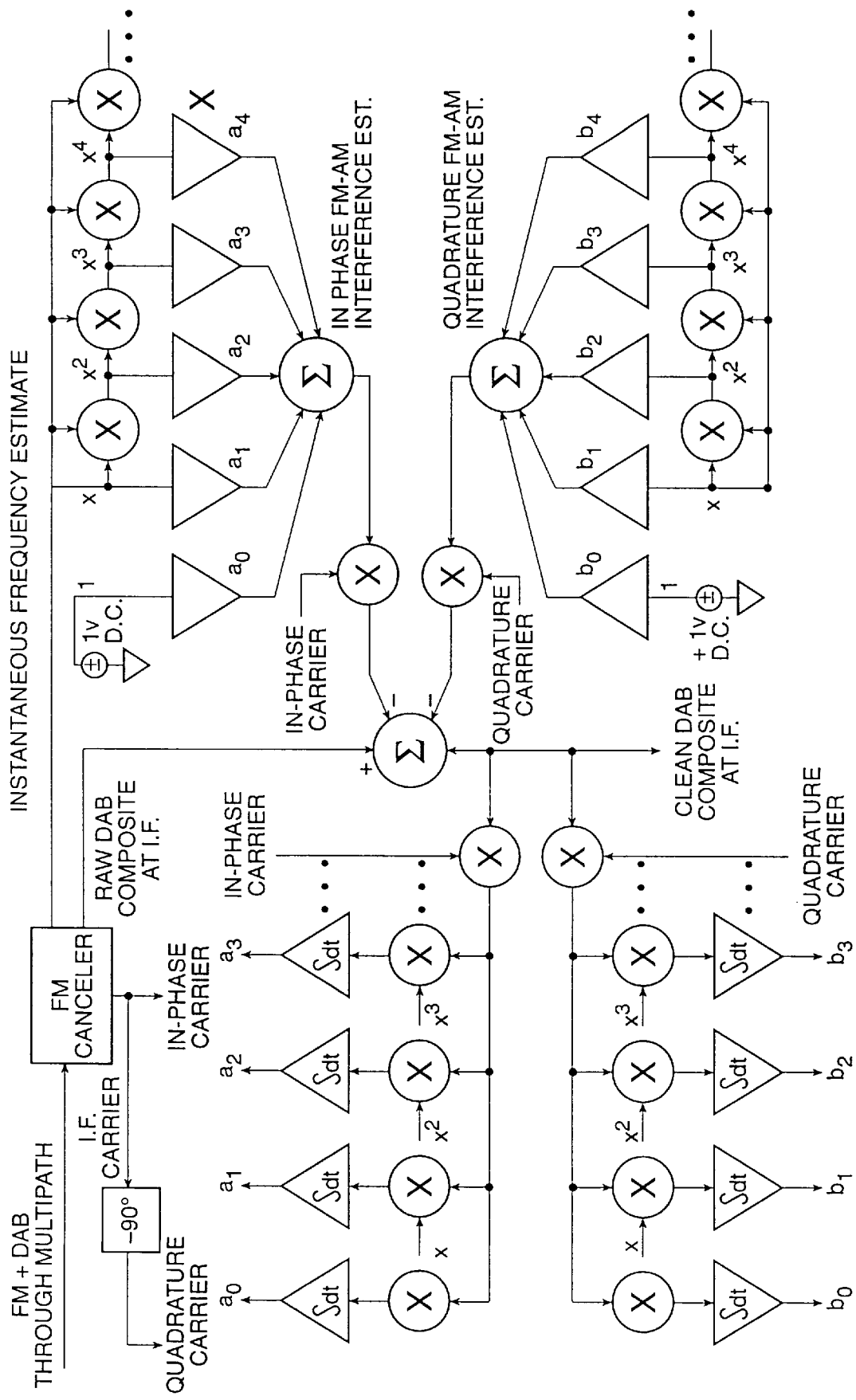
FIG. 47 is a schematic diagram of a polynomial estimation embodiment of an FM to AM interference canceler is used in IF processing.

A second embodiment based on polynomial channel estimation is shown in FIG. 46. In this case, the FM signal frequency estimate drives a polynomial generator which estimates the FM to AM conversion interference 954 in the channel. This estimate is subtracted at 938 from the raw DAB composite 936. The coefficients 970 of the polynomial are derived by measuring and integrating the cross-correlation between the resulting DAB composite 960 and each term of the polynomial. In this manner, the coefficients of the FM to AM cancellation polynomial are always adjusted so as to drive the FM to AM interference terms to zero after cancellation.

A third embodiment, based also on polynomial channel estimation, may be used for systems where DAB processing takes place at an intermediate frequency (IF). This system is illustrated in FIG. 49. Two separate polynomials are used to continuously estimate and cancel the in phase and quadrature components of the FM to AM interference.

While this invention has been described as having a preferred design, it is understood that it is capable of further modifications, uses and/or adoptions of the invention following in general the principle of the invention and including such departures from the present disclosure as come within the known or customary practice in the art to which the invention pertains and as may be applied to the central features hereinbefore set forth, and fall within the scope of the invention and of the limits of the appended claims.

We claim:

1. A method for transmitting an in-band on-channel frequency modulation digital broadcast signal, comprising the steps of:
   a) frequency modulating an FM message to produce an FM waveform;
   b) demultiplexing a DAB serial data message to produce a plurality of digital data subchannel signals;
   c) modulating the digital data subchannel signals to produce digital data subchannel waveforms;
   d) combining the FM waveform with the digital data subchannel waveforms to produce a first signal; and combining the FM waveform with said first signal to generate an in-band on-channel frequency modulation digital broadcast signal, wherein said in-band on-channel frequency modulation digital broadcast signal comprises said plurality of subchannel waveforms spectrally arrayed around said FM waveform, said subchannel waveforms slewing in frequency with said FM waveform.

2. The method of claim 1 wherein the step of combining the FM waveform with the digital data subchannel waveforms to produce a first signal comprises multiplying the FM waveform with the digital data subchannel waveforms.

3. The method of claim 1 wherein the step of combining the FM waveform with said first signal to generate an in-band on-channel frequency modulation digital broadcast signal comprises summing the FM waveform with the first signal.

4. The method of claim 1 wherein the step of modulating the digital data subchannel signals comprises:
   a) producing, from the digital data subchannel signals, data signals;
   b) generating a reference signal; and
   c) summing the data signals and the reference signal to produce digital data subchannel waveforms.

5. The method of claim 4, further comprising emphasizing portions of said digital data subchannel waveforms.

6. A method for receiving and demodulating a plurality of information signals modulated into an in-band on-channel frequency modulated digital broadcast signal, comprising:
   a) converting the in-band on-channel frequency modulated digital broadcast signal to an intermediate frequency signal;
   b) separating the intermediate frequency signal into a first demodulated baseband FM message and a second DAB AM baseband message;
   c) producing from said second message a matched filtered waveform, wherein parameters which produce said matched filtered waveform are dynamically determined by examination of history of said second message; and
   d) demodulating the matched filtered waveform to generate a digital data signal.

7. Apparatus for producing an in-band on-channel digital broadcast signal, comprising:
   a) means for frequency modulating an FM message to produce an FM waveform;
   b) means for demultiplexing a DAB serial data message to produce a plurality of digital data subchannel signals;
   c) means for modulating the digital data subchannel signals to produce digital data subchannel waveforms;
   d) means combining the FM waveform with the digital data subchannel waveforms to generate a double sideband suppressed carrier AM over FM signal; and
   e) means combining the FM waveform with the double sideband suppressed carrier AM over FM signal to generate an in-band on-channel frequency modulation digital broadcast signal, wherein said in-band on-channel frequency modulation digital broadcast signal comprises said plurality of subchannel waveforms spectrally arrayed around said FM waveform, said subchannel waveforms slewing in frequency with said FM waveform.

8. A receiver comprising:
   a) means converting an in-band on-channel frequency modulated digital broadcast signal to an intermediate frequency signal;
   b) means separating the intermediate frequency signal into a first demodulated baseband FM message and a second DAB AM baseband message;
   c) means producing from said second message a matched filtered waveform, wherein parameters which produce said matched filtered waveform are dynamically determined by examination of history of said second message; and
   d) means demodulating the matched filtered waveform to generate a digital data signal.

9. Apparatus for broadcasting and receiving an in-band on-channel digital broadcast, comprising:
   a) means for frequency modulating an FM message to produce an FM waveform;
   b) means for demultiplexing a DAB serial data message to produce a plurality of digital data subchannel signals;
   c) means for modulating the digital data subchannel signals to produce digital data subchannel waveforms;
   d) means combining the FM waveform with the digital data subchannel waveforms to generate a double sideband suppressed carrier AM over FM signal;
   e) means combining the FM waveform with the double sideband suppressed carrier AM over FM signal to generate an in-band on-channel frequency modulation digital broadcast signal, wherein said in-band on-channel frequency modulation digital broadcast signal comprises said plurality of subchannel waveforms spectrally arrayed around said FM waveform, said subchannel waveforms slewing in frequency with said FM waveform;

f) means transmitting said in-band on-channel frequency modulation digital broadcast signal;

g) means receiving said in-band on-channel frequency modulation digital broadcast signals;

h) means converting the received in-band on-channel frequency modulated digital broadcast signal to an intermediate frequency signal;

i) means separating the intermediate frequency signal into a first, demodulated baseband FM, message and a second, DAB AM baseband, message;

k) means producing from said second message a matched filtered waveform; and l) means demodulating the matched filtered waveform to generate a digital data signal.

* * * * *